(12) United States Patent
Gomi et al.

(10) Patent No.: US 8,443,920 B2
(45) Date of Patent: May 21, 2013

(54) INVERTED PENDULUM TYPE VEHICLE

(75) Inventors: Hiroshi Gomi, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/395,705

(22) PCT Filed: Sep. 18, 2009

(86) PCT No.: PCT/JP2009/004756
§ 371 (c)(1),
(2), (4) Date: Mar. 13, 2012

(87) PCT Pub. No.: WO2011/033585
PCT Pub. Date: Mar. 24, 2011

(65) Prior Publication Data
US 2012/0175175 A1 Jul. 12, 2012

(51) Int. Cl.
*B62D 21/00* (2006.01)

(52) U.S. Cl.
USPC .............................. 180/21; 180/7.1

(58) Field of Classification Search
USPC ............... 180/282, 271, 218, 7.1, 21
See application file for complete search history.

(56) References Cited

U.S. PATENT DOCUMENTS

| | | | | |
|---|---|---|---|---|
| 3,399,742 | A * | 9/1968 | Malick | 180/21 |
| 6,571,892 | B2 * | 6/2003 | Kamen et al. | 180/8.2 |
| 7,273,116 | B2 * | 9/2007 | Kamen et al. | 180/21 |
| 7,823,676 | B2 * | 11/2010 | Yamada et al. | 180/218 |
| 8,249,773 | B2 * | 8/2012 | Kawada et al. | 701/36 |
| 2010/0057319 | A1 * | 3/2010 | Inaji et al. | 701/70 |
| 2010/0070132 | A1 * | 3/2010 | Doi | 701/36 |
| 2010/0114421 | A1 * | 5/2010 | Doi | 701/29 |
| 2011/0068738 | A1 * | 3/2011 | Gomi et al. | 320/108 |
| 2011/0209932 | A1 | 9/2011 | Takenaka et al. | |

FOREIGN PATENT DOCUMENTS

| | | |
|---|---|---|
| JP | 62-289488 A | 12/1987 |
| JP | 2005-162060 A | 6/2005 |
| WO | 2008/132779 A1 | 11/2008 |
| WO | 2008/139740 A1 | 11/2008 |

* cited by examiner

*Primary Examiner* — Nicole Verley
(74) *Attorney, Agent, or Firm* — Carrier Blackman & Associates, P.C.; Joseph P. Carrier; William D. Blackman

(57) ABSTRACT

The present invention provides an inverted pendulum type vehicle which can perform a turning movement with ease without requiring any additional device even though the vehicle is configured to travel on a single drive wheel. A substantially vertical principal axis of inertia of the vehicle is tilted rearward with respect to a plumb vertical line. As result, when a rider shift his gravitational center in either lateral direction and tilts the vehicle in the corresponding direction, the main wheel is caused to turn around the principal axis of inertia so that the main wheel is steering in effect, and the vehicle can be turned in a desired direction.

5 Claims, 18 Drawing Sheets

INVERTED PENDULUM TYPE VEHICLE

TECHNICAL FIELD

The present invention relates to an inverted pendulum type vehicle which is configured to travel while maintaining an upright posture, and in particular to an inverted pendulum type vehicle which travels on a single wheel consisting of a drive wheel and can change the traveling direction.

BACKGROUND OF THE INVENTION

Known is an inverted pendulum type vehicle that comprises a pair of drive assemblies individually actuated by electric motors and a main wheel held between the drive assemblies and frictionally driven by the drive assemblies. See Patent document 1, for instance. The main wheel disclosed in Patent document 1 comprises a ring-shaped annular member and a plurality of driven rollers arranged along the circumference of the annular member so as to be rotatable around axial line parallel to the respective tangential lines of the annular member, and the driven rollers are driven by the drive assemblies that engage the driven rollers. When the driven rollers are rotated around the rotational axial lines extending in the tangential directions of the annular member, the inverted pendulum type vehicle is propelled in the lateral direction. When the driven rollers are rotated in the circumferential direction of the annular member, the inverted pendulum type vehicle is propelled in the fore and aft direction.

PRIOR ART DOCUMENT(S)

Patent Document(S)

Patent document 1: WO2008/132779A1
Patent document 2: WO2008/139740A1

BRIEF SUMMARY OF THE INVENTION

Task to be Accomplished by the Invention

As this inverted pendulum type vehicle travels on a single wheel, and can maintain an upright posture even when the vehicle is traveling at low speed or completely stationary, the vehicle is able to freely maneuver in narrow places, and provides a sort of convenience which any other conventional vehicles are not able to provide. Also, the size and weight of the vehicle can be both small so that the vehicle can be transported to other places, and used in various places.

However, as the vehicle travels on a single wheel, a steering action is not possible. The vehicle may be able to travel in oblique directions, but involves some difficultly in achieving a turning maneuver that involves a yaw rate. If the rider twists his or her body, and changes the rider's moment of inertia by sticking out or retracting the rider's arms, some rotational moment may be created around the ground contact point, and this causes a turning movement of the vehicle. However, when this is actually attempted by the inventors, it was discovered that the turning maneuver cannot be achieved without experiencing some difficulty.

Therefore, it was proposed to provide a ground contacting member such as a rod that engages the road surface at a point other than the ground contact point of the main wheel to the inverted pendulum type vehicle for the purpose of creating a rotational moment (torque) around the ground contact point, and enabling a turning movement to the vehicle in a favorable manner. See Patent document 2. This allows a turning movement to be achieved in a favorable manner, but complicates the structure of the vehicle because of the need for the additional ground contact member and a control arrangement for controlling the action of the ground contact member.

In view of such problems of the prior art, a primary object of the present invention is to provide an inverted pendulum type vehicle which can perform a turning movement with ease without requiring any additional device even though the vehicle is configured to travel on a single wheel.

Means to Accomplish the Task

To achieve such an object, the present invention provides an inverted pendulum type vehicle, comprising: a base frame provided with a drive unit; a main wheel provided in a lower part of the base frame and configured to be circumferentially actuated by the drive unit; a rider support unit provided in the base frame for supporting a rider of the vehicle; and a forward motion control unit for propelling the vehicle by controlling a circumferential drive force applied to the main wheel according to a condition of the vehicle and maintaining the vehicle in an upright posture; wherein a substantially vertical principal axis of inertia of the vehicle is tilted rearward with respect to a plumb vertical line.

Effect of the Invention

A rigid body has three principal axes of inertia. The rotation of a rigid body around one of the principal axes of inertia does not couple with the rotation of the rigid body around the other principal axes of inertia, and can therefore be performed in a stable manner. In particular, it is possible to apply a torque to a vehicle by dynamically displacing an object supported by the vehicle. If the associated principal axis of inertia is tilted rearward, the principal axis of inertia crosses the ground surface at a point located ahead of the ground contact point of the main wheel of the vehicle. If the object supported by the vehicle shifts the gravitational center thereof in either lateral direction, and causes the vehicle to tilt in the corresponding direction, the main wheel is caused to rotate around the principal axis of inertia so that the vehicle is steered in effect, and can be turned in the corresponding direction.

This can be applied to a vehicle provided with a pair of wheels on either side, but can be particularly favorably applied to a vehicle that comprises a plurality of driven rollers provided on the main wheel so as to be rotatively driven around a circumferential axial line of the main wheel, and a lateral motion control unit configured to maintain the vehicle in an upright posture by controlling a rotational drive force applied to each driven roller according to a condition of the vehicle.

If the principal axis of inertia consists of a minimum principal axis of inertia, the rotation around this axial line can be achieved particularly easily so that the vehicle can turn in a favorable manner by taking advantage of such a rotation. When the vehicle further comprises a battery for powering the drive unit, the battery being positioned such that a gravitational center of the battery is located above and behind a gravitational center of the vehicle and/or when the drive unit comprises an electric motor, the electric motor being positioned such that a gravitational center of the electric motor is located below and ahead of a gravitational center of the vehicle, the substantially vertically directed principal axis of inertia may consist of a minimum axis of inertia that involves a minimum moment of inertia.

DETAILED DESCRIPTION OF THE PREFERRED EMBODIMENTS

Figure 1:
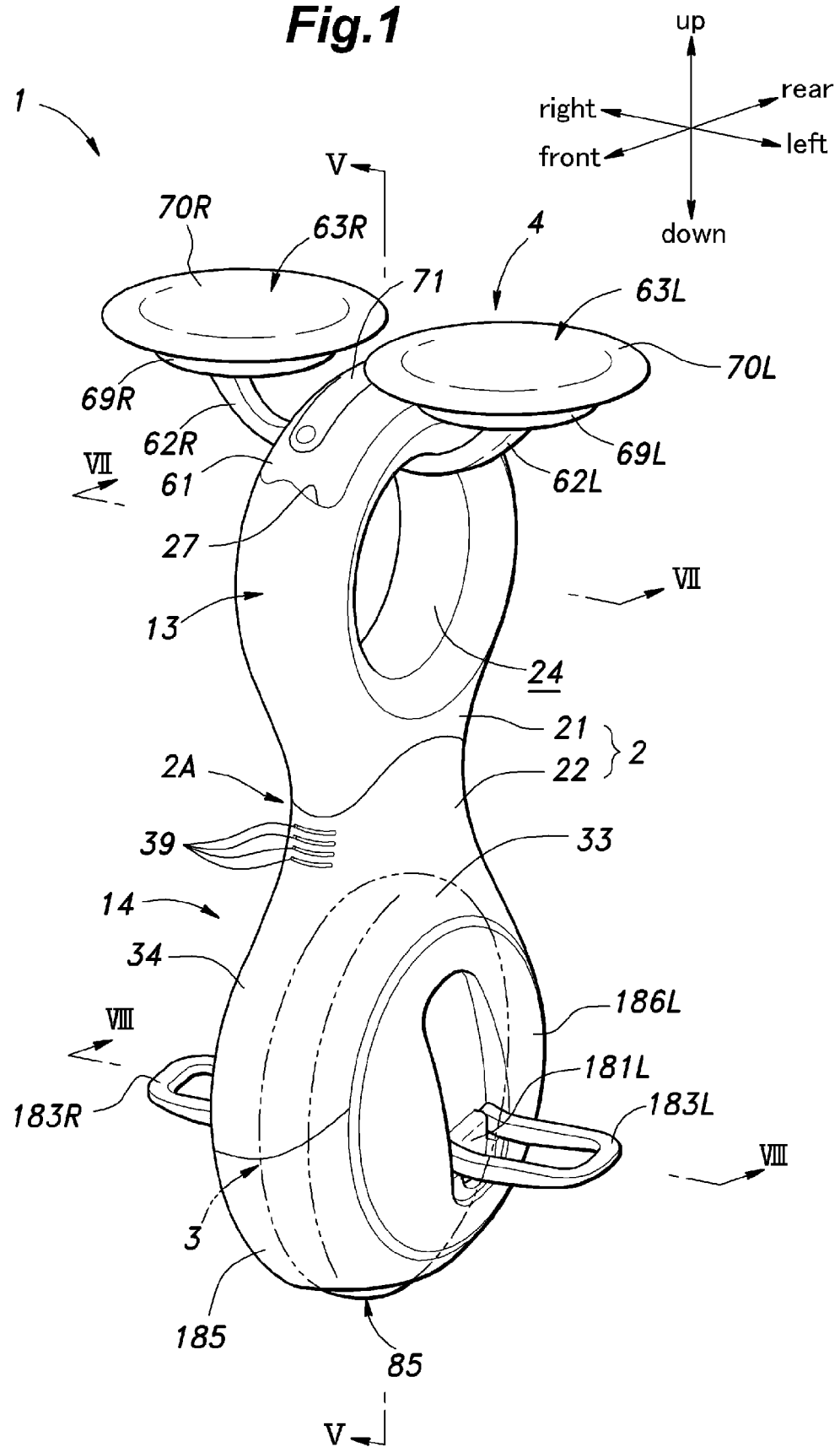
FIG. 1 is a perspective view of an inverted pendulum type vehicle embodying the present invention which is put ready for boarding (with a saddle and steps deployed)
Figure 2:
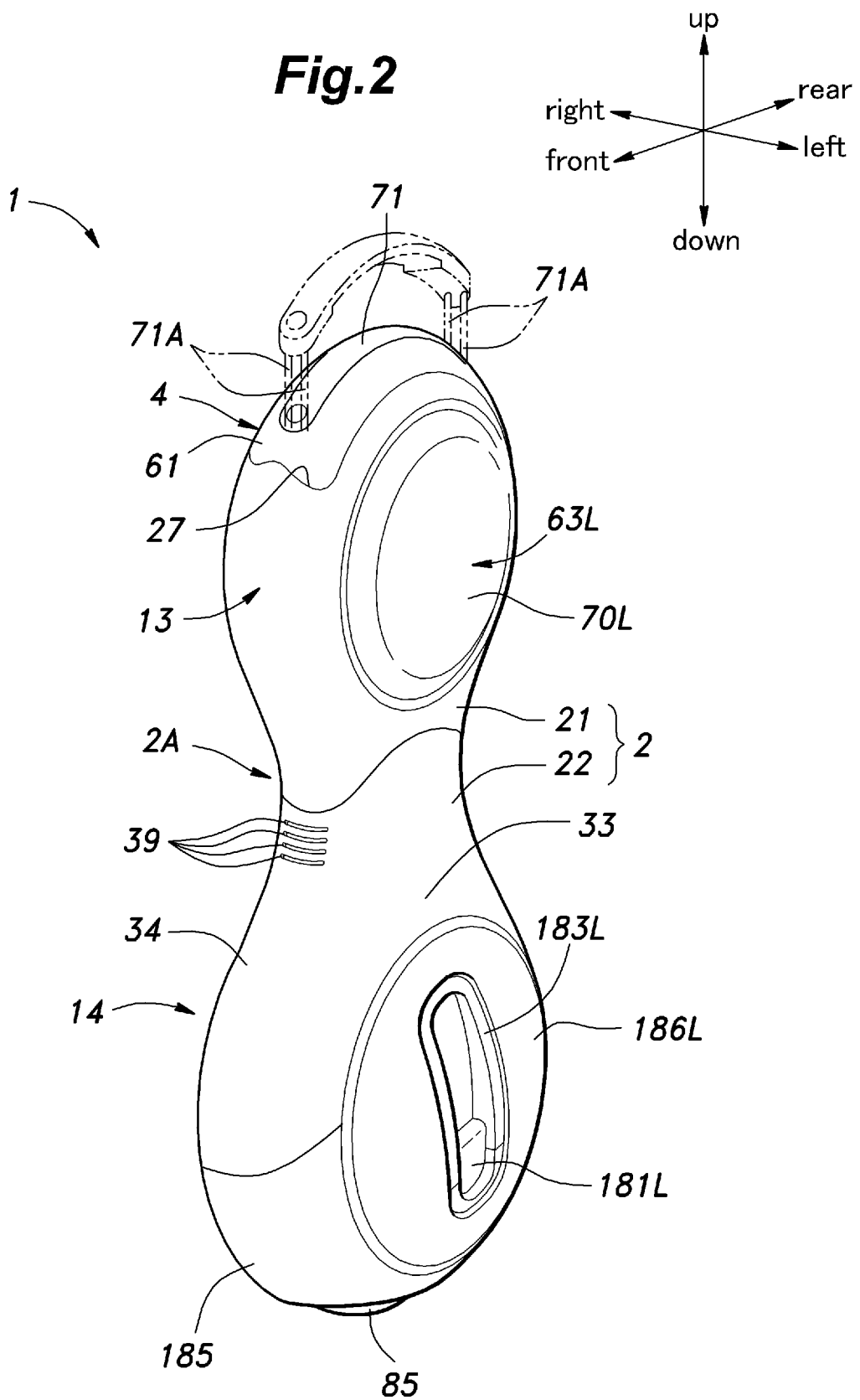
FIG. 2 is a perspective view of the inverted pendulum type vehicle (with the saddle and the steps retracted)

An inverted pendulum type vehicle 1 embodying the present invention is described in the following with reference to the appended drawings. In the following description, the orientation and direction of the inverted pendulum type vehicle and components thereof are defined as indicated by the arrows representing the vertical, fore and aft and lateral directions in the drawings. In regard to the components that are laterally symmetric each other, only one of them on either side may be described in the following by adding a suffix L or R to the numeral indicating such a part.

<Overall Structure of the Inverted Pendulum Type Vehicle>

As shown in FIGS. 1 to 5, the inverted pendulum type vehicle (vehicle) 1 includes a frame 2 consisting of a base frame forming a vertically extending frame structure, a drive unit 3 provided in a lower part of the frame 2, a seat unit 4 provided in an upper part of the frame 2 to support an object, an electric unit 11 provided in the frame 2 and a battery unit 10 for supplying electric power to the various units and sensors. The electric unit 11 includes an inverted pendulum control unit (which is referred to simply as a control unit in the following description) 5, a load sensor 6 and a tilt sensor 7. The control unit 5 controls the operation of the drive unit 3 according to the input signals from the various sensors according to an inverted pendulum control, and maintains the vehicle 1 in an upright posture. The vehicle 1 is provided with strain sensors 8L and 8R and rotary encoders 9L and 9R in appropriate parts thereof, separately from the electric unit 11.

<Structure of the Frame>

Figure 3:
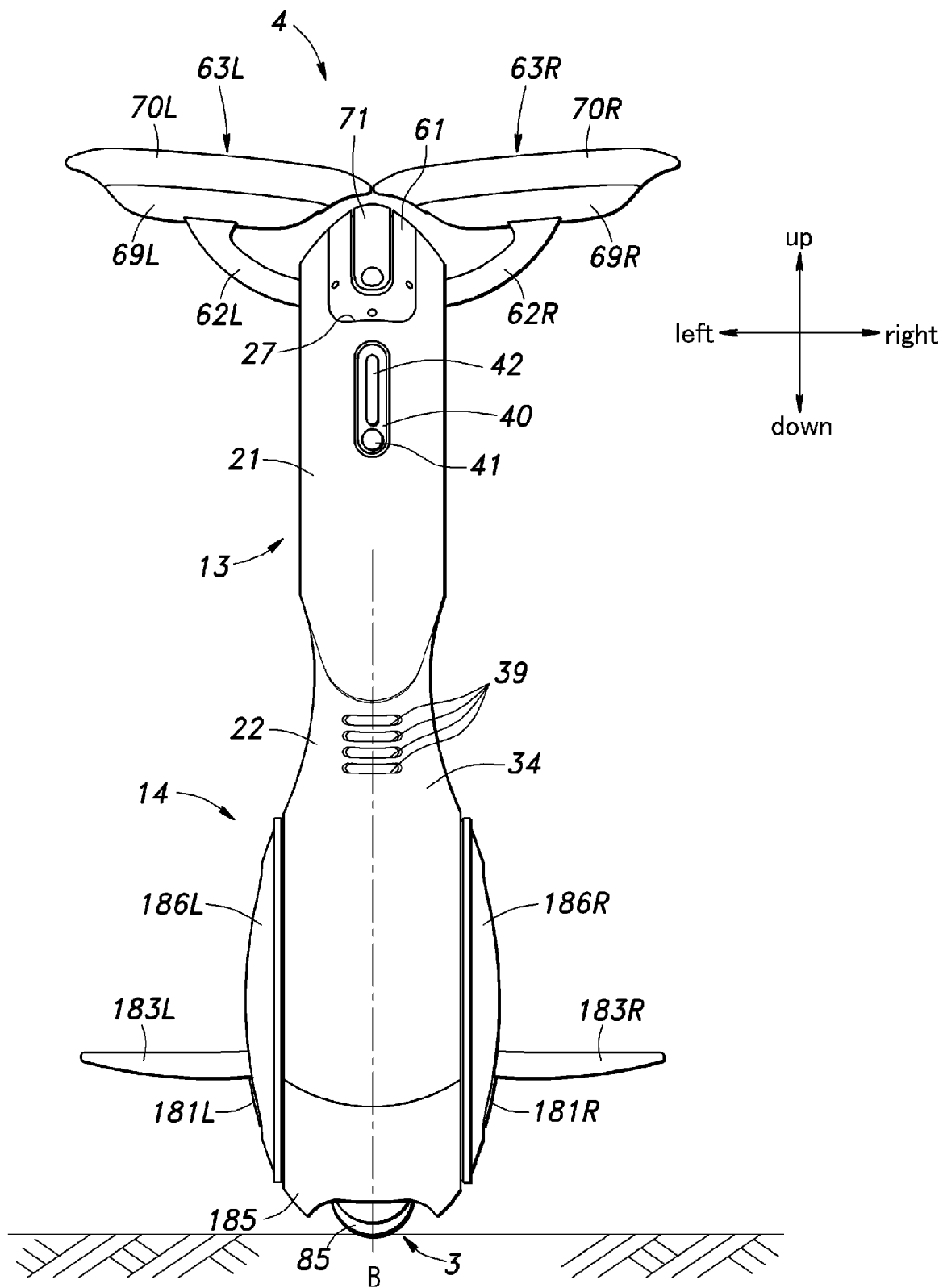
FIG. 3 is a rear view of the inverted pendulum type vehicle ready for boarding.

As shown in FIG. 1, the frame 2 consists of a hollow shell structure, and is given with a flattened shape by being more elongated in the fore and aft direction than in the lateral direction. The frame 2 is provided with a narrowed portion 2A in a vertically middle part thereof. The narrowed portion 2A is reduced in the fore and aft dimension as compared to other parts of the frame 2, and is internally receives the electric unit 11 therein. The frame 2 is thus provided with the shape of numeral "8" as seen from the side. As shown in FIG. 3, the frame can be separated into an upper frame 21 and a lower frame 22 at the narrowed portion 2A. The upper frame 21 and the lower frame 22 are made of dry carbon (carbon fiber reinforced plastic: CFRP) prepared by thermally curing an appropriately shaped carbon prepreg sheet. As will be discussed hereinafter, the upper frame 21 and the lower frame 22 are connected to each other via the load sensor 6 (FIG. 5).

Figure 5:
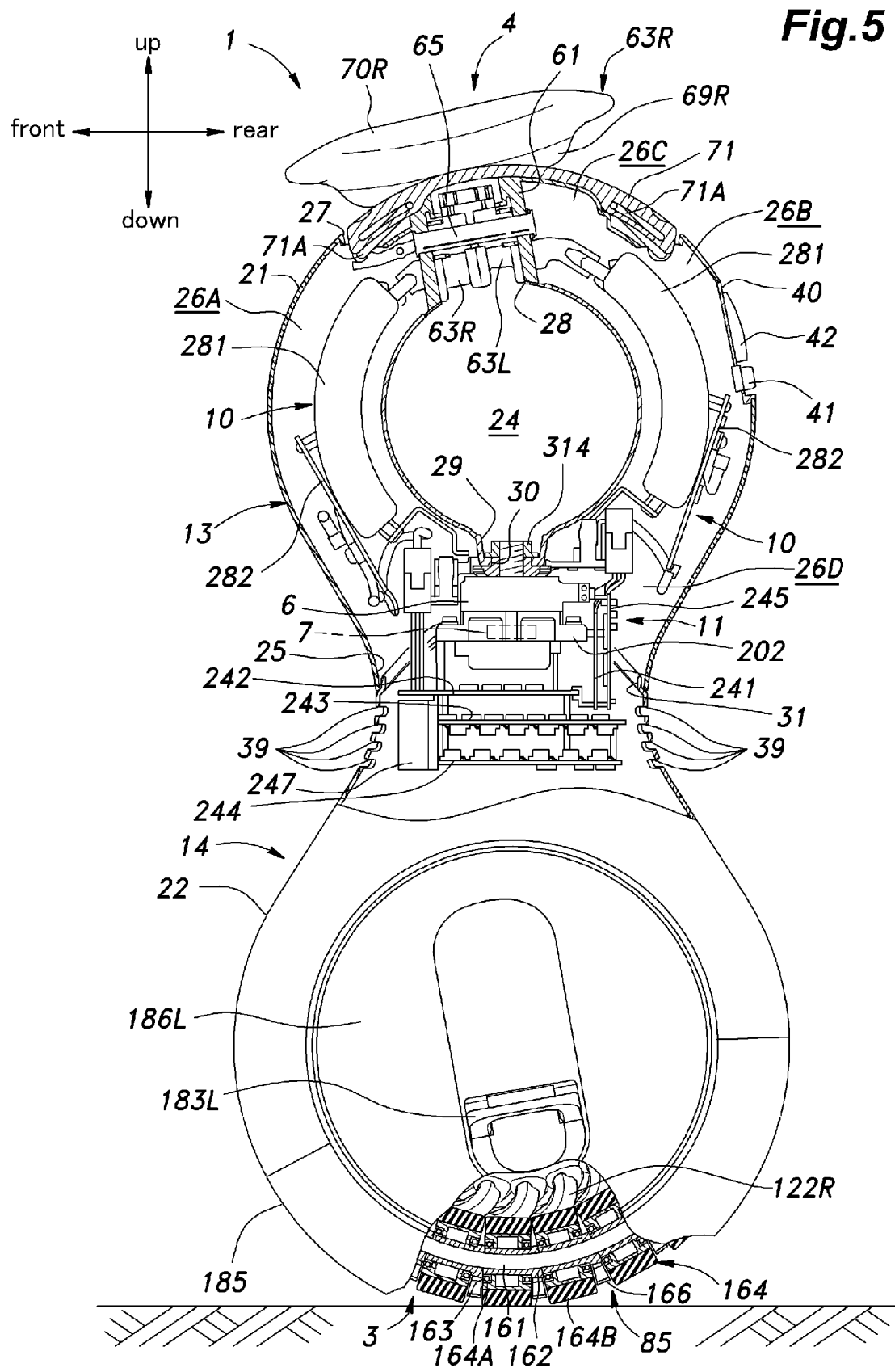
FIG. 5 is a sectional view taken along line V-V of FIG. 1.

As shown in FIG. 5, the upper frame 21 is given with an annular shape so as to define a central space or a saddle storage space 24 passed laterally across the upper frame 21. The hollow interior of the upper frame 21 includes a front space 26A, a rear space 26B, an upper space 26C, and a lower space 26D which are named according to their positional relationship to the saddle storage space 24. The lower end of the upper frame 21 is formed with a lower opening 25 facing downward so that the lower space 26D communicates with the exterior of the upper frame 21. The upper end of the upper frame 21 is formed with an upper opening 27 communicating the upper space 26C with the exterior of the upper frame 21. The upper wall of the saddle storage space 24 is formed with a saddle mounting hole 28 that communicates the upper space 26C with the saddle storage space 24. The part of the lower wall of the saddle storage space 24 located above the lower opening 25 is formed with a recess 29 which is recessed downward, and a connecting hole 30 is formed centrally in the bottom wall of the recess 29. The recess 29 and the connecting hole 30 form a connection portion for connecting an upper structure with a lower structure as will be described hereinafter.

As shown in FIG. 3, in a rear side of the upper frame 21 is embedded a switch panel 40 which includes a power switch 41 to turn on and off the main power of the vehicle 1 and a power lamp 42 that lights up when the main power is turned on.

Figure 6:
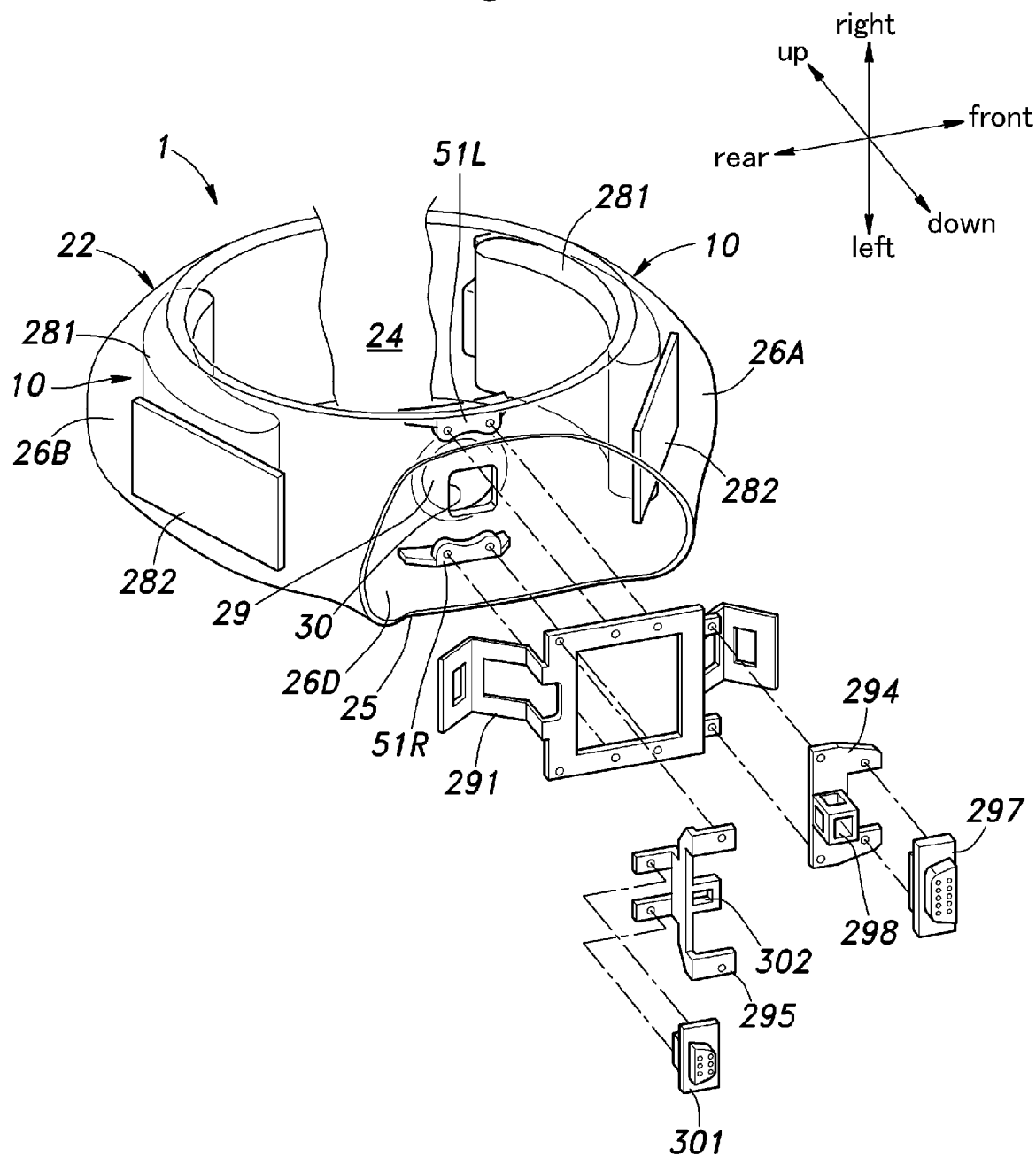
FIG. 6 is an exploded perspective view of the upper structure of the inverted pendulum type vehicle.

As shown in FIG. 6, to the inner surface of the upper wall of the lower inner space 26D are bonded a pair of metallic support bases 51L and 51R on either lateral side of the recess 29. Each support base 51L, 51R is provided with a horizontal plate section extending in the fore and aft direction, and a pair of threaded holes are formed vertically in the horizontal plate section.

Figure 4:
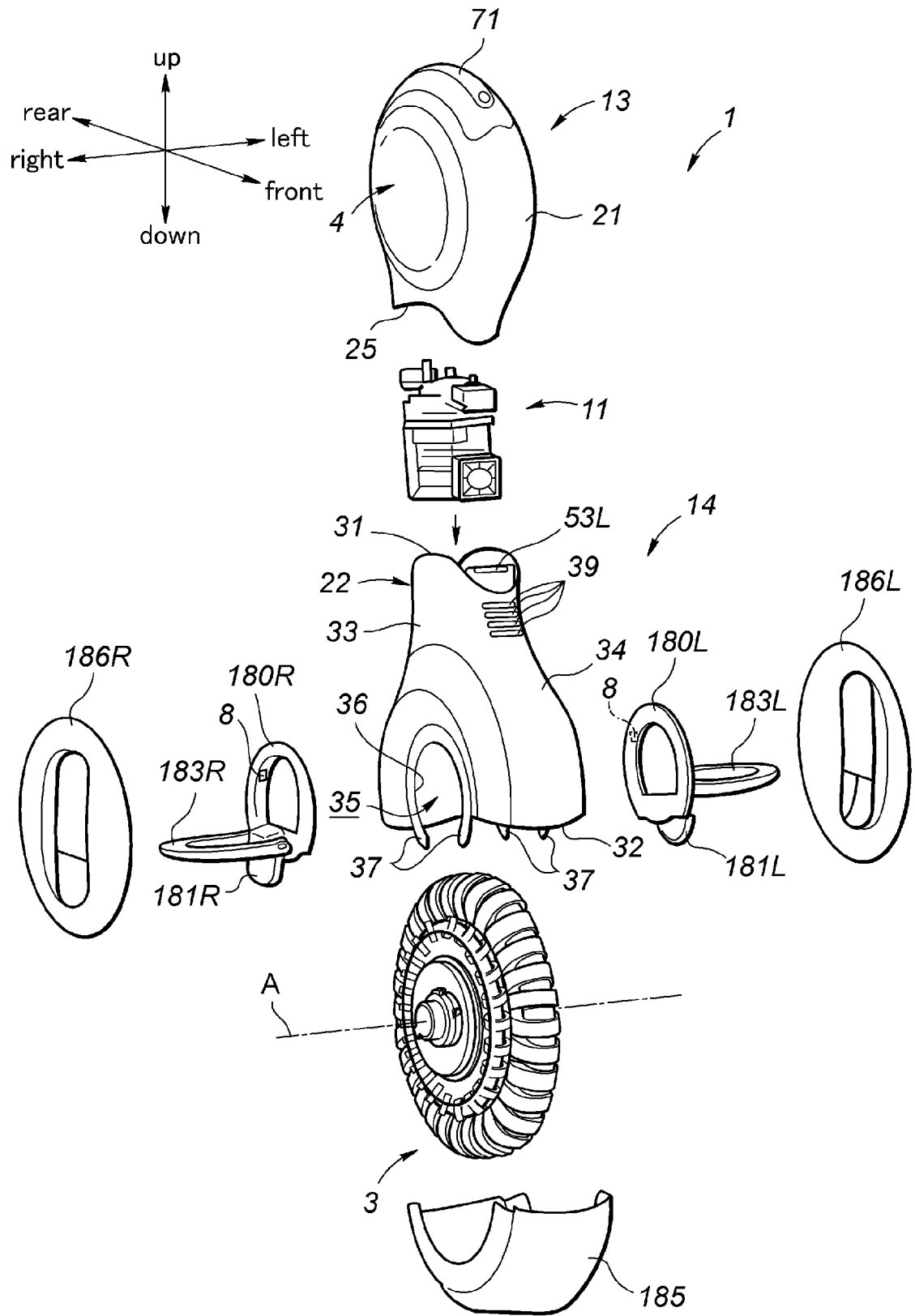
FIG. 4 is an exploded perspective view of the inverted pendulum type vehicle.

As shown in FIG. 4, the lower frame 22 is also made of a hollow shell having an upper opening 31 and a lower opening 32. The lower frame 22 includes a pair of side walls 33 extending vertically in mutually parallel relationship. The front and rear walls 34 bulge in forward and rearward directions, respectively, adjacent to lower parts thereof so that a lower part of the lower frame 22 presents a substantially semi-circular side profile. The lower part of the lower frame 22 defines a receiving space 35 for receiving an upper half of the drive unit 3.

The lower edge of each side wall 33 of the lower frame 22 is provided with a semi-circular cutout 36 substantially concentric to the semi-circular side profile of the lower frame 22. The semi-circular cutouts 36 of the two side walls 33 are conformal and coaxial to each other. Each semi-circular cutout 36 is flanked by a pair of tongue pieces 37 depending therefrom as seen in a side view. The upper part of each of the front and rear walls 34, adjacent to the narrow section 2A of the frame 2, is formed with vent slots 39 which, in this case, consist of a plurality of laterally elongated holes arranged vertically in mutually parallel relationship.

To the inner surface of an upper end of each side wall 33, adjacent to the upper opening 31, is fixedly attached a metallic support base 53L, 53R which includes a horizontal plate section extending in the fore and aft direction, and a pair of threaded holes 54 (FIG. 11) are formed in the horizontal plate section one behind the other.

Figure 8:
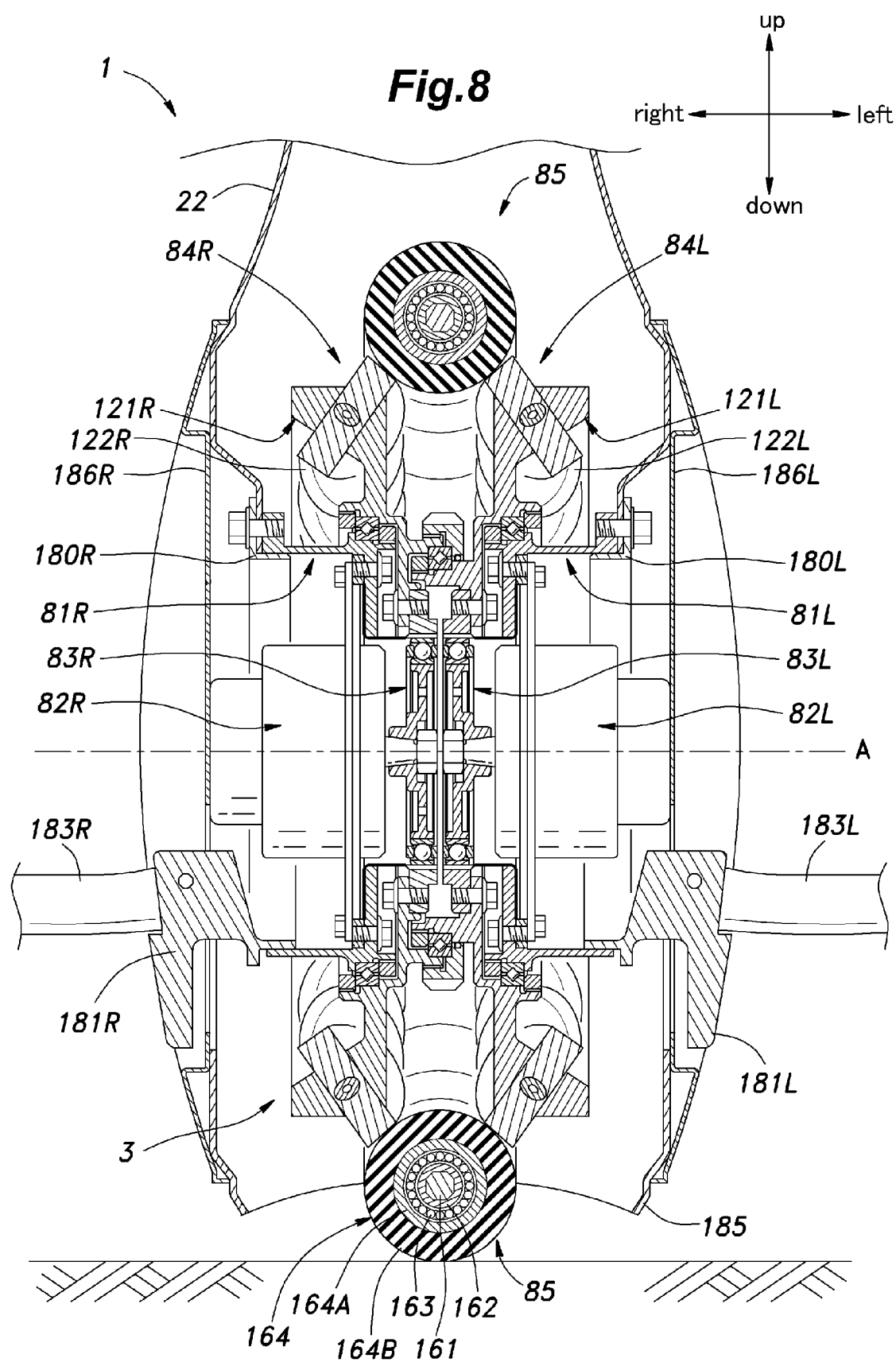
FIG. 8 is a sectional view taken along line VIII-VIII of FIG. 1.

Referring to FIG. 5, the upper frame 21 forms an upper structure 13 in cooperation with the seat unit 4 and battery unit 10, and the lower frame 22 forms a lower structure 14 in cooperation with the drive unit 3, electric unit 11 and sensors 8 and 9 (FIGS. 4 and 8). The upper structure 13 can be separated from the lower structure 14 when necessary.

<Structure of the Seat Unit>

Figure 7:
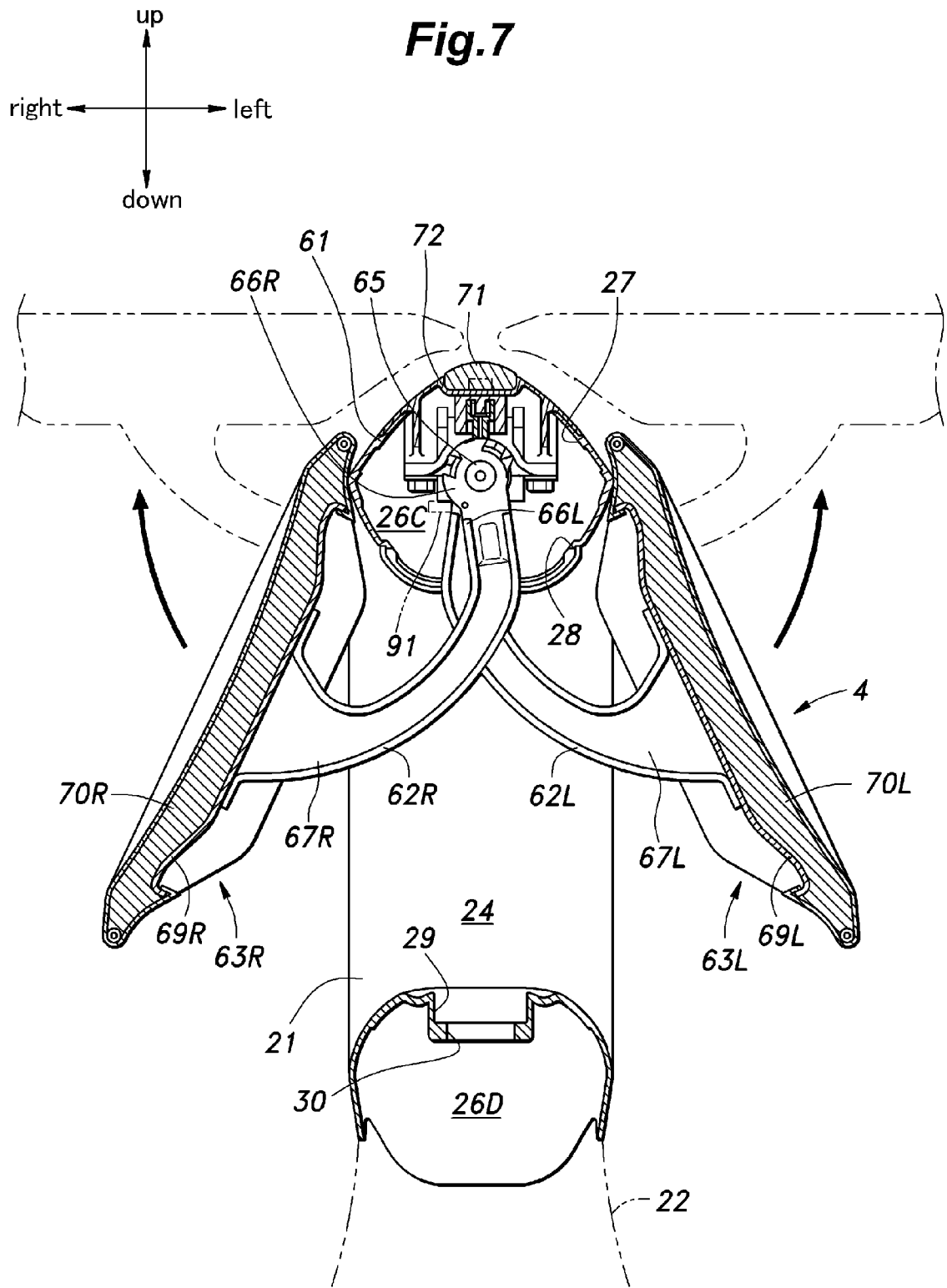
FIG. 7 is a sectional view taken along line VII-VII of FIG. 1.

Referring to FIG. 7, the seat unit 4 includes a base main body 61, a pair of saddle arms 62L and 62R and a pair of saddle members 63L and 63R. The base main body 61 is installed in the upper space 26C from the upper opening 27, and an upper wall of the base main body 61 closes the upper opening 27. An upper part of the base main body 61 is provided with a support shaft 65 extending in the fore and aft direction.

The support shaft 65 pivotally supports the base ends 66L and 66R of the saddle arms 62L and 62R. Each saddle arm 62L, 62R extends from the base end 66L, 66R thereof, and is passed through the saddle mounting hole 28. The free end 67L, 67R of each saddle arm 62L, 62R is therefore located outside of the upper frame 21. The left saddle arm 62L is rotatable between a retracted position in which the free end 67L thereof is located below the base end 66L thereof or within the saddle storage space 24 and a deployed position (service position) located to the left of the base end 66L thereof. Similarly, the right saddle arm 62R is rotatable between a retracted position in which the free end 67R thereof is located below the base end 67R thereof or within the saddle storage space 24 and a deployed position (service position) located to the right of the base end 66R thereof. Each saddle arm 62L, 62R is curved so that the convex side thereof faces downward in the deployed position thereof.

The saddle arms 62L and 62R are connected to each other via a link mechanism not shown in the drawings so that one of them may be retracted when the other one is retracted, and deployed when the other one is deployed. The base main body 61 is provided with a lock member (not shown in the drawings) which is selectively engaged by an engagement hole provided in each of the saddle arms 62L and 62R so that the saddle arms 62L and 62R may be fixed at each of the retracted position and deployed position as required.

The free end 67L, 67R of each saddle arm 62L, 62R is fitted with the corresponding saddle member 63L and 63R that includes a support portion 69L, 69R by which the saddle member 63L, 63R is connected to the saddle arm 62L, 62R and a disk shaped cushion pad 70L, 70R supported by the support portion 69L, 69R. Each cushion pad 70L, 70R defines a seat surface 70A, on a side thereof opposite from the support portion 69L, 69R, for supporting a hip of a vehicle occupant. As shown in FIG. 3, when the saddle arms 62L and 62R are in the deployed position, each saddle member 63L, 63R, in particular the seat surface 70A thereof, faces upward. Each cushion pad 70L, 70R is configured to support a corresponding hip or thigh of the vehicle occupant, and the load of the vehicle occupant is transmitted to the upper frame 21 via the saddle members 63L and 63R, saddle arms 62L and 62R and base main body 61.

When the saddle arms 62L and 62R are in the retracted position, the support portions 69L, 69R of the saddle members 63L and 63R are received within the saddle storage space 24 and the cushion pads 70L and 70R close the respective sides of the saddle storage space 24.

The upper wall of the base main body 61 is fitted with a retractable grip handle 71 that can be used for lifting and carrying the vehicle 1 by the user. When not in use, the grip handle 71 may be received in a handle receiving recess 72 formed in the upper wall of the base main body 61 as indicated by the solid lines in FIG. 2. When in use, the grip handle 71 may be raised above the base main body 61, and connected to the base main body 61 via a pair of legs 71A as indicated by the imaginary lines in FIG. 2. Therefore, when the vehicle is powered off, the user can lift and carry the vehicle 1 or maintain the vehicle in the upright posture by holding the grip handle 71.

<Structure of the Drive Unit>

Figure 9:
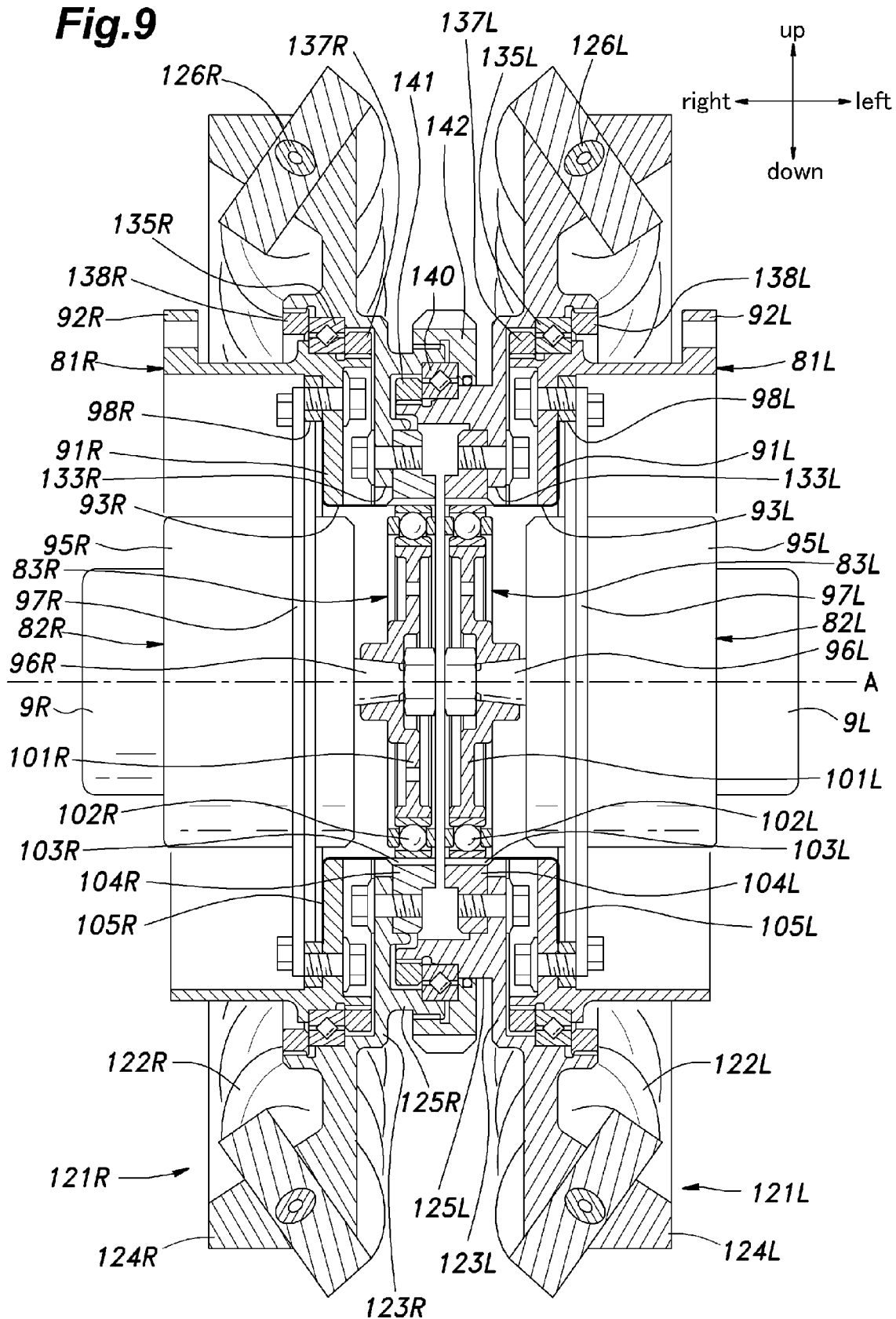
FIG. 9 is an enlarged sectional view of a part of FIG. 8.

As shown in FIGS. 8 and 9, the drive unit 3 comprises a pair of symmetrically opposing drive assemblies 84L, 84R each comprising a mount member 81L, 81R fixedly attached to the lower frame 22, an electric motor 82L, 82R mounted on the mount member 81L, 81R, a wave gear device 83L, 83R for reducing the rotational speed of the output shaft of the motor 82L, 82R, and a drive disk 121L, 121R rotatively actuated by the electric motor 82L, 82R via the wave gear device 83L, 83R. The drive unit 3 further comprises a main wheel 85 interposed between the two drive assemblies 84L and 84R, and rotatively actuated by the two drive assemblies 84L and 84R. As the mount members 81L and 81R, the electric motors 82L and 82R and the wave gear device 83L and 83R are laterally symmetric to each other, only the left hand side parts thereof are described in the following while the description of the right hand side parts thereof are omitted from the description. As the two drive assemblies 84L, 84R are slightly different from each other, the right hand side parts are omitted from description as far as the symmetric parts are concerned, but the right hand side parts are also described with respect to the asymmetric parts.

As shown in FIG. 8, each mount member 81L consists of a cylindrical member having a closed bottom 91L at one end and an open end at the other end, and is provided with a plurality of radial external projections 92L at the open axial end thereof. The bottom 91L of each mount member 81L is centrally provided with a through hole 93L. Each mount member 81L receives the corresponding electric motor 82L therein.

Each electric motor 82L consists of a brushless DC motor, and comprises a cylindrical stator housing 95L internally fitted with stator coils (not shown in the drawings), a rotor shaft 96L rotatably supported by the stator housing 95L and having an end (output shaft) extending out of the stator housing 95L, and a permanent magnet (not shown in the drawings) fixedly attached to the rotor shaft 96L in the stator housing 95L. The stator housing 95L is provided with a radial flange 97L on an outer periphery thereof, which is attached to the radial internal flange 91L of the mount member 81L by using threaded bolt via a spacer 98L such that a space is defined between these two flanges 97L and 91L are joined to each other by threaded bolts. The electric motor 82L is coaxially supported by the mount member 81L. The rotor shaft 96L is passed through the through hole 93L of the mount member 81, and extends out of the mount member 81L. The free end of the rotor shaft 96L (output shaft) is connected to an input end of the wave gear device 83L, and the opposite end of the rotor shaft 96L is connected to an input end of a rotary encoder 9L for detecting the angular position of the rotor shaft 96L. The rotary encoder 9L of a per se known type, and is provided with a housing which is attached to the stator housing 95L.

The wave gear device 83L may consist of a per se known structure, and comprises a wave plug 101L consisting of a highly stiff member having an elliptic profile and serving as an input member, a flexible wave bearing 102L fitted on the wave plug 101L, a flexible external gear member 103L consisting of a flanged cylindrical thin shell frictionally engaging the outer circumferential surface of the wave bearing 102L and provided with external teeth on the outer circumferential surface thereof, and the internal gear member 104L consisting of a stiff ring and provided with internal teeth meshing with the external teeth of the external gear member 103L. The external gear member 103L is provided with a flange 105L axially extending therefrom through the central opening 93L of the central opening 93L of the radial internal flange 91L, and further extending radially to be fixedly interposed between the two flanges 96L and 91L. The wave plug 101L is coaxially connected to the rotor shaft 96L, and the rotation of the rotor shaft 96L is transmitted to the internal gear member 104L at a large reduction ratio. The internal gear member 104L is connected to a corresponding drive disk 121L which will be described hereinafter.

As shown in FIGS. 8 and 9, each drive assembly 84L comprises a drive disk 121L and a plurality of drive rollers 122L rotatably supported by the drive disk 121L. The drive disk 121L includes a central disk portion 123L having a coaxial through hole 133L, a large annular portion 124L extending outwardly in the axial direction from the outer periphery of the central disk portion 123L and a small annular portion 125L extending inwardly in a coaxial relationship from the central disk portion 123L. The inner diameter of the large annular portion 124L is grater than the outer diameter of the cylindrical portion of the mount member 81L.

The large annular portion 124L is provided with a plurality of drive rollers 122L each rotatably supported via a roller shaft 126L and arranged circumferentially at a regular interval. The drive rollers 122L may be made of highly stiff material such as metal and hard plastic.

The drive rollers 122L are arranged such that the planes of rotation of the drive rollers 122L are each disposed neither in parallel to nor perpendicular to the axial center line (center of rotation) of the drive disk 121L. Further, the planes of rotation are arranged in a rotationally symmetric fashion around the axial line of the drive disk 121L. The positional relationship of the drive rollers 122L on the drive disk 121L may be similar to the gear teeth of a helical bevel gear of a prescribed cone angle. For more detailed description of the drive unit, see WO2008/139740A (US20100096905A1). The roller shafts 126L are positioned such that the outer periphery of each drive roller 122L is located radially more outward than the outer periphery of the large annular portion 124L.

The right and left drive disks 121L and 121R differ from each other in that the inner diameter of the small annular portion 125R of the right drive disk 121R is larger than the outer diameter of the small annular portion 125L of the left drive disk 121L. The right drive disk 121R is otherwise similar to the left drive disk 121L.

Each drive disk 121L is rotatably supported by the outer circumferential surface of the cylindrical portion of the mount member 81L in a coaxial relationship at the inner circumference of the large annular portion 124L via a crossed roller bearing 135L. The crossed bearing 135L consists of a roller bearing that can withstand both a radial load and an axial load, and is kept immobile in the axial direction by fastening rings 137L and 138L threaded onto the drive disk 121L and mount member 81L, respectively. Thereby, the drive disk 121L is fixed in position relative to the mount member 81L.

When the drive disk 121L is assembled to the mount member 81L as described above, the wave gear device 83L is placed inside the through hole 133L of the central disk portion 123L of the drive disk 121L. An outer peripheral part of the internal gear member 104L of the wave gear device 83L is attached to the central disk portion 123L of the drive disk 121L by threaded bolts. Thus, the rotational output of the electric motor 82L is transmitted to the drive disk 121L via the wave gear device 83L that reduces speed.

The two drive disks 121L and 121R are held coaxial to each other owing to a crossed roller bearing 140 interposed between the outer circumferential surface of the small annular portion 125L of the left drive disk 121L and the inner circumferential surface of the small annular portion 125R of the right drive disk 121R. The crossed bearing 140 is kept immobile in the axial direction by fastening rings 141 and 142 threaded onto the small annular portions 125L and 125R of the left and right drive disks 121L and 121R, respectively. Thereby, the two drive disks 121 and 121R are fixed in position relative to each other in the axial direction.

Thus, the two mount members 81L and 81R, electric motors 82L and 82R, wave gear devices 83R and 83L and drive disks 121L and 121R are disposed on the common axial line (center of rotation). Hereinafter, this common axial line is referred to as the rotational axial line A of the drive unit 3.

When the two drive disks 121L and 121R are joined to each other (or the drive assemblies 84L and 84R are fully assembled), the two sets of drive rollers 122L and 122R are spaced from each other by a prescribed distance, and interpose the main wheel 85 between them.

The main wheel 85 comprises an annular member 161 made of a ring having a polygonal cross section, a plurality of inner sleeves 162 fixedly fitted on the annular member 161 at a regular interval and a driven roller 164 rotatable supported by the outer circumferential surface of each sleeve 162 via a ball bearing 163. The driven rollers 164 may each consist of a metal cylinder 164A fitted on the outer race of the ball bearing 163 and a rubber cylinder 164B integrally vulcanized onto the outer circumferential surface of the metal cylinder 164A. The material of the tubular rubber member 164B is not limited to rubber, but may consist of other resilient elastomeric material. The tubular rubber members 164B of the driven rollers 164 engage the road surface when the vehicle 1 is in operation (or traveling).

The driven rollers 164 along with the associated inner sleeves 162 are arranged circumferentially along the entire circumference of the annular member 161, and the driven rollers 164 are each freely rotatable around the axial line thereof which is tangential to the corresponding position of the annular member 162. A disk shaped cover 166 (see FIG. 5) is interposed between each adjacent pair of driven rollers 164 to thereby keep foreign matter from intruding into the ball bearings 163.

The inner diameter of the main wheel 85 defined by the driven rollers 164 is smaller than the outer diameter of each drive assembly 84L, 84R defined by the corresponding drive rollers 122L, 122R. The outer diameter of the main wheel 85 is larger than the outer diameter of the drive assemblies 84L, 84R. The inner and outer diameters of the main wheel 85 and each drive assembly 84L, 84R are defined by the corresponding envelopes of the drive rollers 122 L, 122R and driven rollers 164, respectively. The main wheel 85 is thus assembled with the two drive assemblies 84L and 84R by being interposed between the two drive assemblies 84L and 84R.

When the main wheel 85 is assembled to the two drive assemblies 84L and 84R, the drive rollers 122L and 122R frictionally engage the rubber cylinders 164B of the driven rollers 164 at their respective circumferential surfaces so that the rotation (or propelling force) of the drive rollers 122L and 122R can be transmitted to the driven rollers 164.

The sizes and numbers of the driven rollers 164 and drive rollers 122L and 122R are selected in such a manner that at least one of the driven rollers 164 engages the floor or road surface and at least one each of the left and right drive rollers 122L and 122R engages the driven roller 164 engaging the floor surface. Thereby, the driven roller 164 engaging the floor surface receives a force that causes the rotation of the main wheel 85 around the central axial line A and/or the rotation of the driven roller 164 around the central axial line thereof (tangential to the annular member 161) at all times.

In the illustrated embodiment of the drive unit 3, when the drive disks 121L and 121R are rotated in different directions and/or at different speeds by the electric motors 82L and 82R, the drive rollers 122L and 122R apply to the contact surface between the two sets of the drive rollers 122L and 122R and the driven rollers 164 a component of force which is perpendicular to the circumferential (tangential) force owing to the rotation of the drive disks 121L and 121R. This component of force causes each of the driven rollers 164 to rotate around the central axial line thereof.

The rotation of the drive rollers 164 is determined by the speed difference between the two drive disks 121L and 121R. When the two drive disks 121L and 121R are rotated at a same speed in opposite directions, the driven rollers 164 do not rotate circumferentially along the circumference of the main wheel 85 and rotate only around the central axial lines thereof. Therefore, the main wheel 85 produces a lateral drive force (propulsion force).

On the other hand, when the two drive disks 121L and 121R are rotated at a same speed in a same direction, the driven rollers 164 rotate circumferentially along the circumference of the main wheel 85 without rotating around the respective axial lines. Therefore, the main wheel 85 produces a fore and aft drive force (propulsion force).

By combining the rotations of the driven rollers around the central axial lines thereof and along the circumference of the main wheel at a desired ratio, the drive unit 3 is able to produce a drive force in any desired direction, with respect to both the lateral and fore and aft directions.

The arrangement for attaching the drive unit 3 to the lower frame 22 is described in the following. As shown in FIG. 4, the upper half of the drive unit 3 is received in the receiving space 35 of the lower frame 22 such that the axial line A is directed laterally with respect to the frame 2. As shown in FIG. 8, the radial external projections 92 of each mount member 81 of the drive unit 3 engage the peripheral edge of the cutout 36 in the side wall of the lower frame 22 and the inner surfaces of the tongue pieces 37.

As shown in FIGS. 4 and 8, a step base 180L, 180R is attached to the outer surface of each side wall 33 of the lower frame 22. The step base 180L, 180R consists of a metallic annular member having an outer profile conforming to those of the cutout 36 and tongue pieces 37. The radial external projections 92L, 92R of each mount member 81L, 81R are formed with threaded holes, and corresponding through holes are formed in the peripheral part of the cutout 36 and tongue pieces 37 so that the peripheral part of the cutout 36, tongue pieces 37 and the step base 180L, 180R are firmly interposed between the step base 180L, 180R and radial external projections 92 by passing threaded bolts into the through holes and threading them into the threaded holes of the radial external projections 92 of each mount member 81. Thus, the two step bases 180 and the drive unit 3 are jointly attached to the lower frame 22.

As shown in FIG. 8, the inner surface of the lower part of each step base 180L, 180R engages the corresponding mount member 81L, 81R through a space defined between the tongue pieces 37. Each step base 180L, 180R is provided with a lower extension 181L, 181R having a base end including an upper part extending axially outward and a lower part generally depending therefrom. The lower extensions 181L and 181R serve as a heat sink so that the heat generated from the electric motors 82L and 82R is transmitted to the step bases 180L and 180R via the mount member 81L, 81R, and then dissipated primarily to the outside via the lower extensions 181L and 181R.

The base end of each lower extension 181L, 181R rotatably supports a base end of a step 183L, 183R via a pivot shaft extending in the fore and aft direction. Each step 183L, 183R is rotatable between a retracted position where the free end of the step 183L, 183R is located substantially above the base end thereof and the step 183L, 183R extends upward along a side of the lower frame 22 and a deployed position where the free end of the step 183L, 183R is located laterally outside of the base end thereof and the step 183 sticks out from the lower frame 22.

As shown in FIG. 4, a step load sensor 8 is attached to an outer surface of each step base 180L, 180R. The load sensor 8 may consist of a per se know strain gauge configured to detect strain in the step base 180L, 180R when the step 183L, 183R is subjected to an external load.

As shown in FIGS. 1 to 4, the lower end of the lower frame 22 is provided with a lower cover 185 which conceals the lower half of the drive unit 3 except for the ground contact area of the main wheel 85. To an outer side of each side wall 33 of the lower frame 22 is attached a side cover 186 which conceals the step base 180, but exposes the step 183L, 183R and the lower extension 181L, 181R.

<Structure of the Electric Unit>

Figure 10:
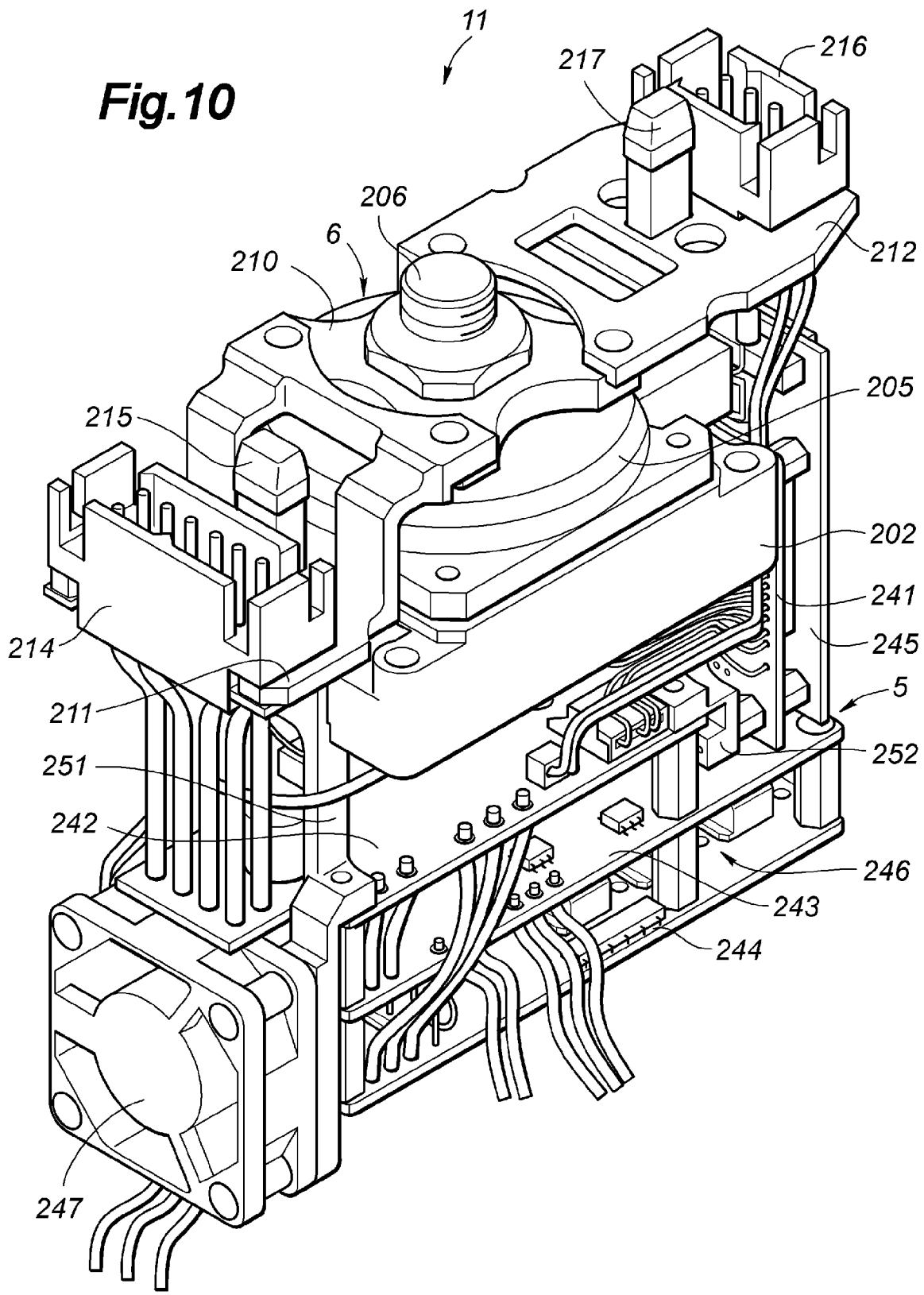
FIG. 10 is a perspective view of an electric unit.

Referring to FIG. 10, the various components of the electric unit 11 such as the control unit 5, upper load sensor 6 and inclination sensor 7 are fixedly attached to an electric mount frame 202. In the following description of the electric unit 11, the fore and aft, lateral and vertical directions are defined with respect to the electric unit 11 as mounted on the lower frame 22.

Figure 11:
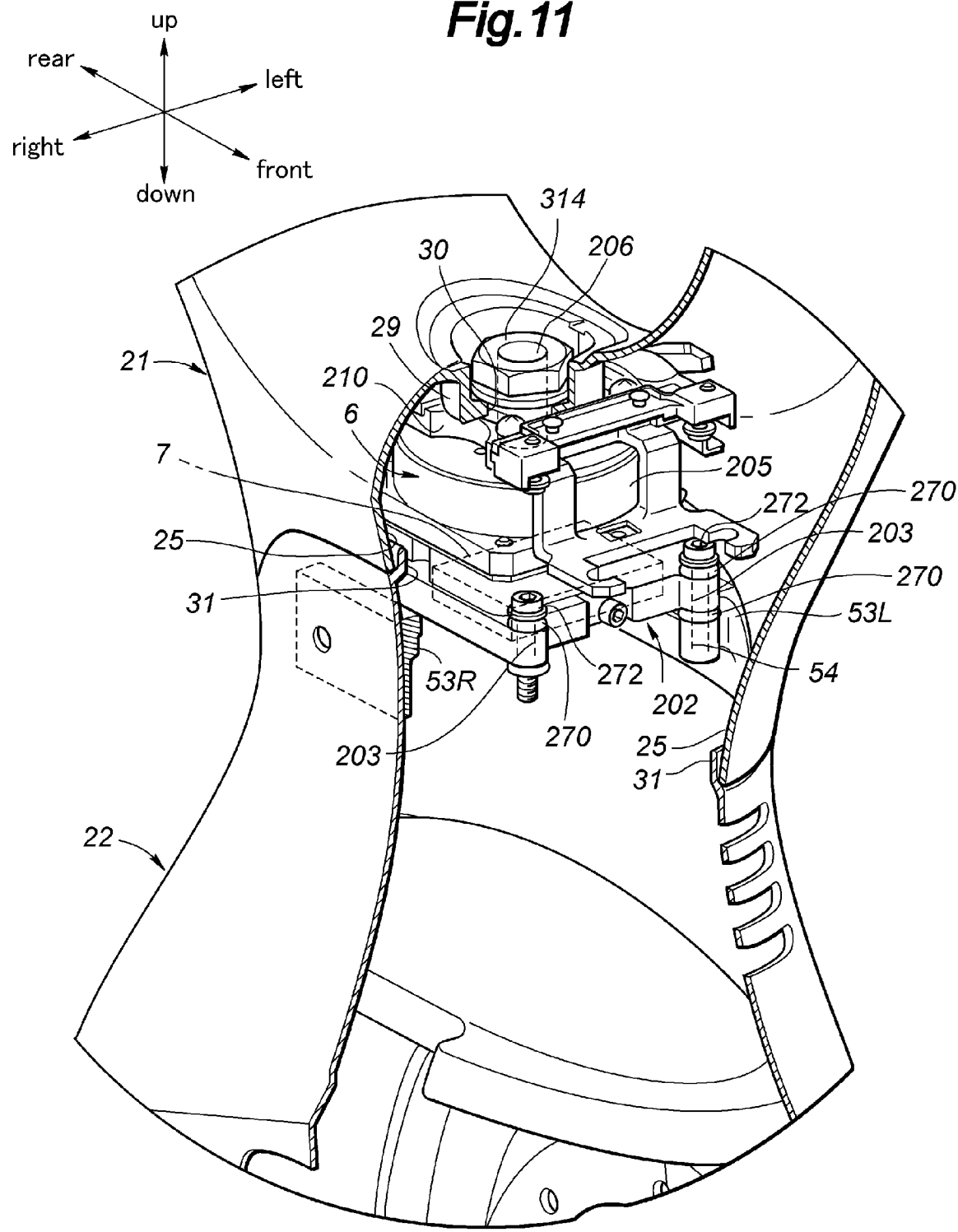
FIG. 11 is a perspective view showing a connecting structure for the upper and lower structures partly in section.

The electric mount frame 202 essentially consists of a rectangular frame member defining a central opening which is dimensioned so as to rest upon the support bases 53L and 53R secured to the corresponding side walls 33 along the side edges thereof as shown in FIG. 11. More specifically, the peripheral part of the electric mount frame 202 is so dimensioned as to be placed across the support bases 53L and 53R of the lower frame 22. The electric mount frame 202 is provided with vertical through holes 203 at positions corresponding to the threaded holes 54 of the support bases 53L and 53R when mounted on the support bases 53L and 53R.

The upper load sensor 6 consists of a tri-axial force sensor that can detect moments around the z-axis (vertical direction), x-axis (for and aft direction) and y-axis (lateral direction), and includes a body portion 205 receiving a sensor circuit board (not shown in the drawings) and fixedly attached to the upper surface of the electric mount frame 202 by threaded bolts, and an input shaft 206 extending upward from the body portion 205. The input shaft 206 is given with a circular cross section, and configured to receive an external force that is to be detected. A male thread is formed along the length of the input shaft 206 from the base end to the free end thereof. The body portion 205 is mounted on the electric mount frame 202, and fixedly secured thereto by using threaded bolts.

The base end of the input shaft 206 is fixedly secured to a planar connecting member base 210. The connecting member base 210 is centrally provided with a threaded hole, and is secured to the input shaft 206 by threading the thread formed around the base end 206B of the input shaft 206 into the threaded hole. The free end of the input shaft 206 projects upward from the connecting member base 210 when the connecting member base 210 is attached to the input shaft 206.

A first connector base 211 is attached to a front part of the connecting member base 210 by using threaded bolts, and extends forward. A second base 212 is attached to a rear part of the connecting member base 210 by using threaded bolts, and extends rearward.

A first connector 214 which is electrically connected to the wiring from a power source circuit board 242 (which will be described hereinafter) is secured to the first connector base 211 by using threaded bolts. The first connector base 211 is provided with a first guide pin 215 extending upward.

A second connector 216 which is electrically connected to the wiring from a control circuit board 241 (which will be described hereinafter) is secured to the second connector base 212 by using threaded bolts. The second connector base 216 is provided with a second guide pin 217 extending upward.

The inclination sensor 7, which may consist of a per se known gyro sensor, is passed downward inside the electric mount frame 202, and fixedly secured thereto by using threaded bolts. The inclination sensor 7 is configured to detect an inclination angle thereof relative to a plumb vertical direction.

As shown in FIG. 10, the control unit 5 includes, in addition to the control circuit board 241 and power source circuit board 242, a left motor driver circuit board 243, a right motor driver circuit board 244, an I/O interface circuit board 245 and a blower fan 247.

The control circuit board 241 includes a control circuit 261 which is incorporated with a CPU formed by a microcomputer, and used for controlling the electric motors 82L and 82R and other components. The control circuit board 241 is mounted on a rear side of the electric mount frame 202 via a spacer so as to extend both vertically and laterally (or with the major surface thereof facing in the fore and aft direction). The lower part of the control circuit board 241 extends downward well beyond the lower side of the electric mount frame 202.

The power source circuit board 242 includes a power control circuit (not shown in the drawings) for converting the voltage of the power supplied by the battery unit 10 to a prescribed voltage. The power source circuit board 242 extends both laterally and in the fore and aft direction (or with the major surface thereof facing vertically), and is fixedly attached thereto via a connecting member 251 extending downward from the front end of the electric mount frame 202. The rear end of the power source circuit board 242 is connected to the lower end of the control circuit board 241 via another connecting member 252.

The left motor driver circuit board 243 and right motor driver circuit board 244 include a left motor driver circuit (inverter circuit) 253 and a right motor driver circuit (inverter circuit) 254 used for the PWM control of the left and right electric motors 82L and 82R, respectively. The left motor driver circuit board 243 is fixedly attached to the power source circuit board 242 via a spacer 401 from below in parallel thereto. The right motor driver circuit board 244 is fixedly attached to the left motor driver circuit board 243 via a spacer 401 from below in parallel thereto. Thereby, air flow passages extending in the fore and aft direction are defined between the power source circuit board 242 and the left motor driver circuit board 243, and between the left motor driver circuit board 243 and right motor driver circuit board 244, respectively.

The I/O interface circuit board 245 includes an input interface circuit 265 and an output interface circuit 266, and is fixedly attached to the electric mount frame 202 via a spacer behind the control circuit board 241 in parallel thereto.

The blower fan 247 consisting of an axial flow fan is connected to the lower end of the connecting member 251 so as to face the space between the left motor driver circuit board 243 and right motor driver circuit board 244 from the front end. The inlet end of the blower fan 247 faces forward while the outlet end of the blower fan 247 faces rearward.

The structure for securing the electric unit 11 to the lower frame 22 is described in the following. As shown in FIG. 11, each through hole 203 of the electric mount frame 202 is fitted with a rubber bush 270 including a tubular portion received in the through hole 203 and a pair of radial flanges radially outwardly extending over the opposite surfaces of the electric mount frame 202 surrounding the through hole 203. Therefore, when each rubber bush 270 is fitted in the corresponding through hole 203, each flange thereof covers the peripheral part of the upper or lower opening of the through hole 203. After placing the electric mount frame 202 on the support bases 53L and 53R of the lower frame 22 via the corresponding flanges of the rubber bushes 270, threaded bolts 272 are passed into the central holes of the rubber bushes 270, and threaded into the threaded holes 54 of the support bases 53L and 53R. Thereby, the electric mount frame 202 is insulated and protected from the vibrations that may be transmitted from the lower frame 22, by the rubber bushes 270.

The electric unit 11, in its installed state, is located in the narrow section 2A of the lower frame 22, and, in particular, the blower fan 247, left motor driver circuit board 243 and right motor driver circuit board 244 are located between the two sets of vent slots 39 formed in the front and rear walls 34A and 34B of the lower frame 22, respectively, so that the cooling air introduced from the front vent slots 39 is passed through the blower fan 247 and the space between the left and right motor driver circuit boards 243 and 244 before being expelled from the rear vent slots 39. Therefore, the left and right motor driver circuit boards 243 and 244 which are the major sources of heat among the various components of the electric unit 11 can be efficiently cooled. Also, as the electric unit 11 is located in the narrow section 2A of the lower frame 22, the flow path between the two sets of vent slots 39 is relatively short, and this also contributes to the efficient cooling of the electric unit 11.

<Structure of the Battery Unit>

As shown in FIGS. 5 and 6, the batter unit 10 consists of two arcuate battery modules 281 each including a plurality of battery cells, one received in the front space 26A and the other in the rear space 26B, and a pair of battery management circuit boards 282. The battery modules 281 are formed by bundling together a plurality of cylindrical battery cells so as to fit in the inner space of the upper frame 21. The battery management circuit boards 282 include a battery management circuit 285 comprising a CPU formed by a microcomputer and associated memory. The battery management circuit 285 is connected to the battery modules 281 so as to control the charging and discharging of the battery modules 281, and select the battery modules 281 that are to be used at each particular moment.

The battery unit 10 is passed into the front space 26A and rear space 26B from the lower opening 25 of the upper frame 21, and is supported from below by a battery bracket 291 which is in turn secured to the support bases 51L and 51R of the upper frame 21 by using threaded bolts.

A third connector base 294 is fixedly attached to the front end of the battery bracket 291 by using threaded bolts, and extends forward therefrom. A fourth connector base 295 is fixedly attached to the rear end of the battery bracket 291 by using threaded bolts, and extends rearward therefrom.

A third connector 297 is secured to the third connector base 294 by using threaded bolts, and is electrically connected to the wiring extending from the battery management circuit boards 282. The third connector 297 is complementary to the first connector 214 so as to be connected thereto, and is provided with a first guide hole 298 extending in the vertical direction and configured to receive the first guide pin 215 of the first connector base 211.

A fourth connector 301 is secured to the fourth connector base 295 by using threaded bolts, and is electrically connected to the wiring extending from the switch panel 40. The fourth connector 301 is complementary to the second connector 216 so as to be connected thereto, and is provided with a second guide hole 302 extending in the vertical direction and configured to receive the second guide pin 217 of the second connector base 212.

<Structure for Connecting the Upper Structure to the Lower Structure>

Figure 12:
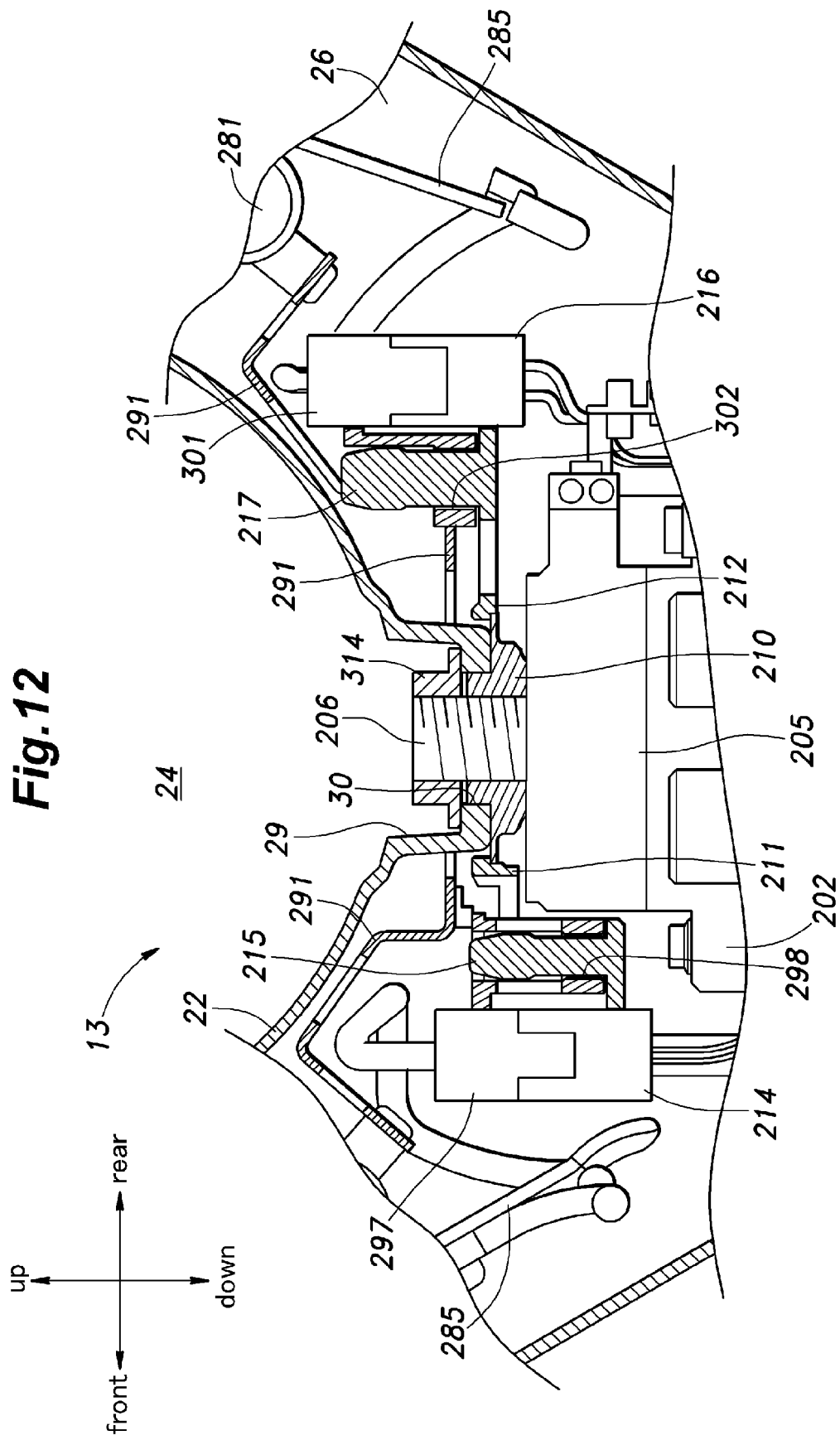
FIG. 12 is a sectional view showing the connecting structure for the upper and lower structures.

The structure for connecting the upper structure 13 including the upper frame 21, seat unit 4 and battery unit 10 to the lower structure 14 including the lower frame 22, drive unit 3 and electric unit 11 is described in the following with reference to FIGS. 11 and 12. In the perspective view of FIG. 11, some of the components are omitted from the illustration for the convenience of illustration. As shown in FIGS. 11 and 12, when joining the upper and lower structures 13 and 14 to each other, the lower opening 25 of the upper frame 21 is opposed to the upper opening 31 of the lower frame 22, and the first guide pin 215 of the lower structure 14 is fitted into the first guide hole 298 of the upper structure 13 while the second guide pin 217 of the lower structure 14 is fitted into the second guide hole 302 of the upper structure 13. This causes the first connector 214 to be connected to the third connector 297, and the second connector 216 to the fourth connector 301. Thereby, the upper and lower structures 13 and 14 are electrically connected to each other so that distribution of electric power and transmission of control signals can be effected between the upper and lower structures 13 and 14.

The lower surface of the wall part of the upper frame 21 defining the recess 29 abuts the upper surface of the connecting member base 210 connected to the input shaft 206 of the upper load sensor 6, and the free end of the input shaft 206 is passed upward through the central connecting hole 30 of the recess 29. By threading a nut 314 onto the input shaft 206, the bottom wall of the recess 29 is firmly held between the connecting member base 210 and nut 314, and the upper frame 21 is supported by the input shaft 206 of the upper load sensor 6. The upper opening 31 of the lower frame 22 is slightly smaller that the lower opening 25 of the upper frame 21 so that the peripheral wall defining the upper opening 31 is snugly received by the lower opening 25 of the upper frame 21.

Thus, the upper structure 13 is supported by the lower structure 14 solely via the load sensor 6 so that the load created by the seating of a vehicle occupant on the seat unit 4 is transmitted to the input shaft 206 of the upper load sensor 6 via the upper structure 13.

<Structure of the Inverted Pendulum Control System>

Figure 13:
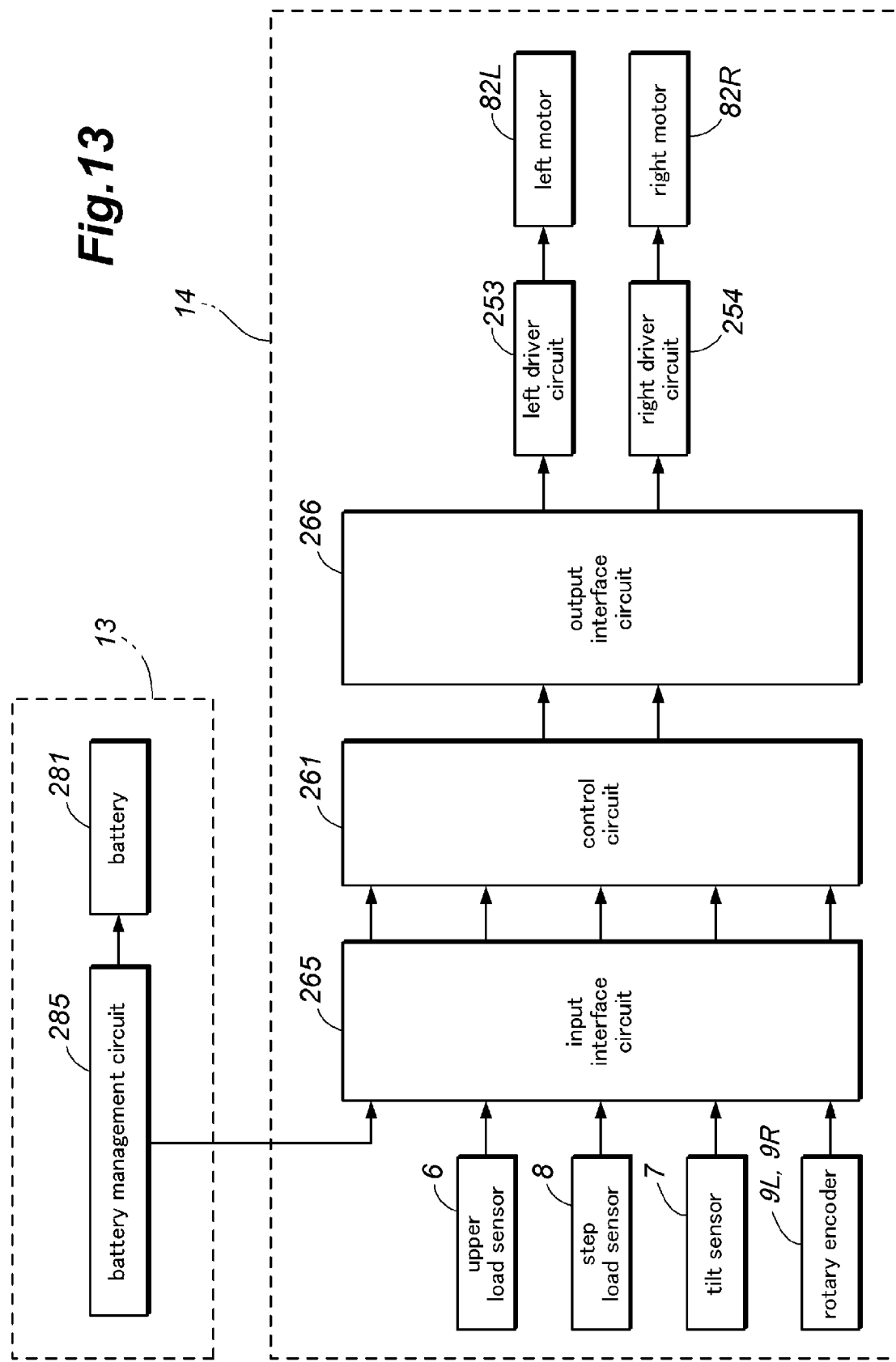
FIG. 13 is a simplified block diagram of a control system of the inverted pendulum type vehicle.

As shown in FIG. 13, the control circuit 261 receives signals from the upper load sensor 6, inclination sensor 7, step load sensors 8, rotary encoders 9 and battery management circuit 285 via the input interface circuit 265. The control circuit 261 is configured to generate PWM signals for driving the left driver circuit 253 and right driver circuit 254 via the output interface circuit 266 so as to maintain the vehicle 1 in an upright posture or perform the inverted pendulum control according to the received signals.

The upper load sensor 6 forwards a signal corresponding to the load applied to the input shaft 206 to the control circuit 261. Each step load sensor 8 forwards a signal corresponding to the load applied to the corresponding step 183 to the control circuit 261. The inclination sensor 7 forwards a signal corresponding to the inclination thereof with respect to a prescribed reference line to the control circuit 261. Each rotary encoder 9 forwards a signal corresponding to the angular position of the corresponding rotor shaft (output shaft) 96 to the control circuit 261. The memory 284 of the battery management circuit 285 stores reference angle data which will be described hereinafter, and forwards the reference angle data to the control circuit 261.

The control circuit 261 computes the load applied to the input shaft 206 according to the signal received from the upper load sensor 6, and determines if a vehicle occupant is seated on the seat unit 4 by comparing the computed load with a prescribed threshold value. The control circuit 261 also computes the loads applied to the steps 183 according to the signals from the step load sensors 8, and determines if and how the vehicle occupant is placing his or her feet on the steps 183 by comparing the computed loads with prescribed threshold values.

Figure 14:
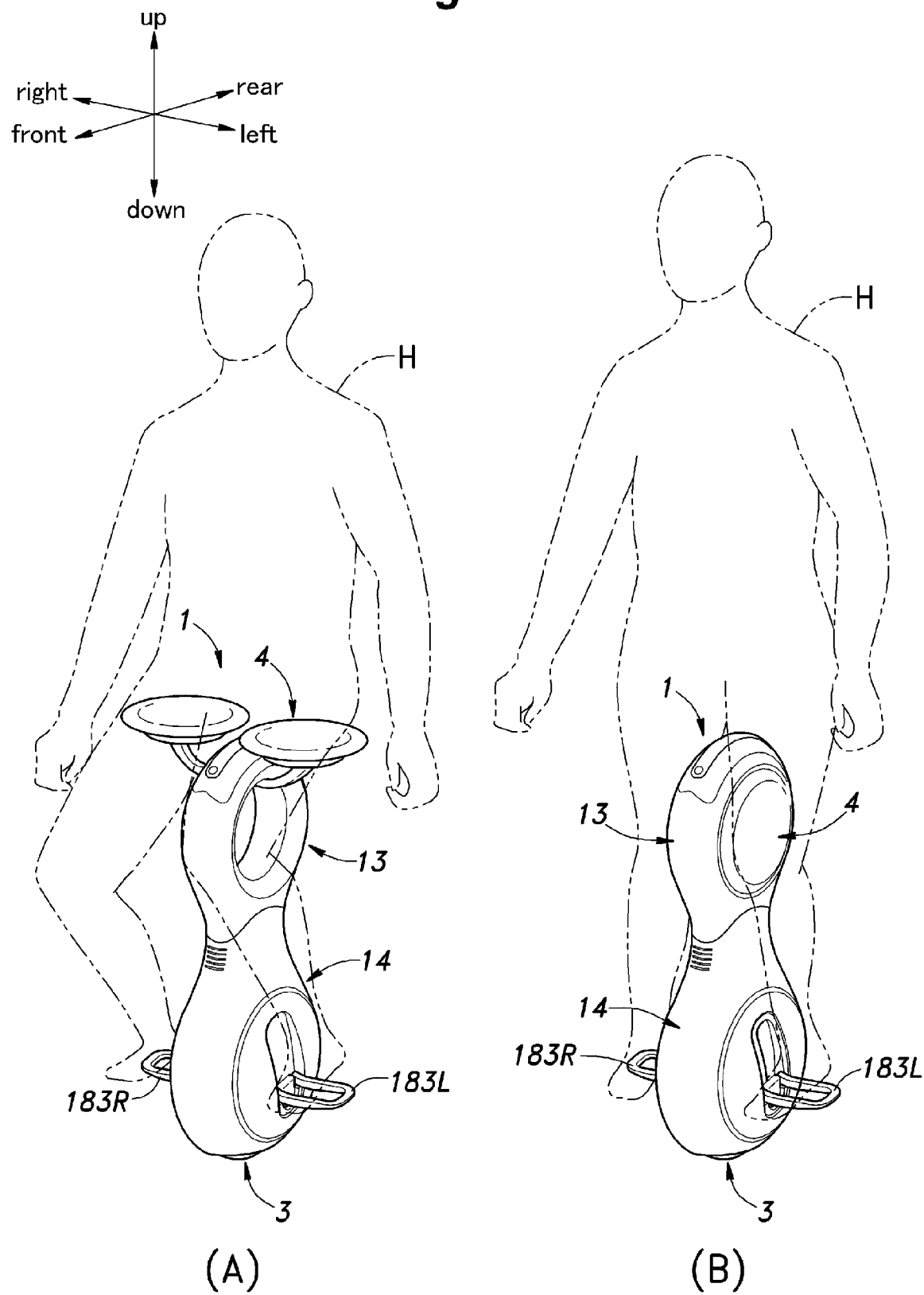
FIG. 14 is a perspective view showing the mode of riding the inverted pendulum type vehicle.

According to the results of determining if a vehicle occupant is seated on the seat unit 4 and if the vehicle occupant is placing his or her feet on the steps 183, the control circuit 261 determines the presence of a vehicle occupant and the riding posture of the vehicle occupant. In the illustrated vehicle 1, the vehicle occupant may ride the vehicle 1 either in a sitting posture by sitting on the seat unit 4 as illustrated in FIG. 14(A), or in a standing posture by standing on the steps 183 and interposing the seat unit 4 (which is in the retracted position at such a time) or in particular the cushion parts thereof between the knees and thighs of the vehicle occupant as illustrated in FIG. 14(B). When no one is sitting on the seat unit 4 and no feet are placed on the steps 183, it is then determined that there is no vehicle occupant on the vehicle 1. If a vehicle occupant is detected sitting on the seat unit 4 with the upper load sensor 6, it can be determined that there is a vehicle occupant in the sitting posture. If the presence of feet on the steps 183 is determined by using the step load sensors 8, it can be determined that there is a vehicle occupant in the standing posture.

The control circuit 261 computes the rotational speeds of the two electric motors 82L and 82R according to the signals from the rotary encoders 9, and uses the obtained speeds for the drive control of the two electric motors 82L and 82R.

The control circuit 261 computes an inclination angle $\theta$ of the axial line B of the lower structure 14 with respect to a vertical (plumb) line C according to the signal from the inclination sensor 7 by using a prescribed computing process. The axial line B of the lower structure 14 extends along the long axis (or vertical line) of the lower frame 22 as shown in FIG. 3. In the xyz rectilinear coordinate system having an x-axis extending in the fore and aft direction, a y-axis extending in the lateral direction and a z-axis extending in the vertical direction, the inclination angle θ may have an x-component θx or an inclination angle in the x-axis direction, and a y-component θy or an inclination angle in the y-axis direction.

The control circuit 261 performs the inverted pendulum control according to the inclination angle θ. In the inverted pendulum control, the vehicle 1 is moved by using the drive unit 3 so that the inclination angle θ is made to coincide with a reference angle θt given as a control target value, and, thereby, the combined gravitational center of the vehicle 1 itself and vehicle occupant is positioned approximately above the road contact point of the drive unit 3 (main wheel 85). As the position of the combined gravitational center varies depending on the presence of the vehicle occupant and the riding posture of the vehicle occupant, the reference angle θt is defined individually for the vehicle 1 without a vehicle occupant, the vehicle carrying a vehicle occupant in a sitting posture and the vehicle carrying a vehicle occupant in a standing posture.

Figure 15:
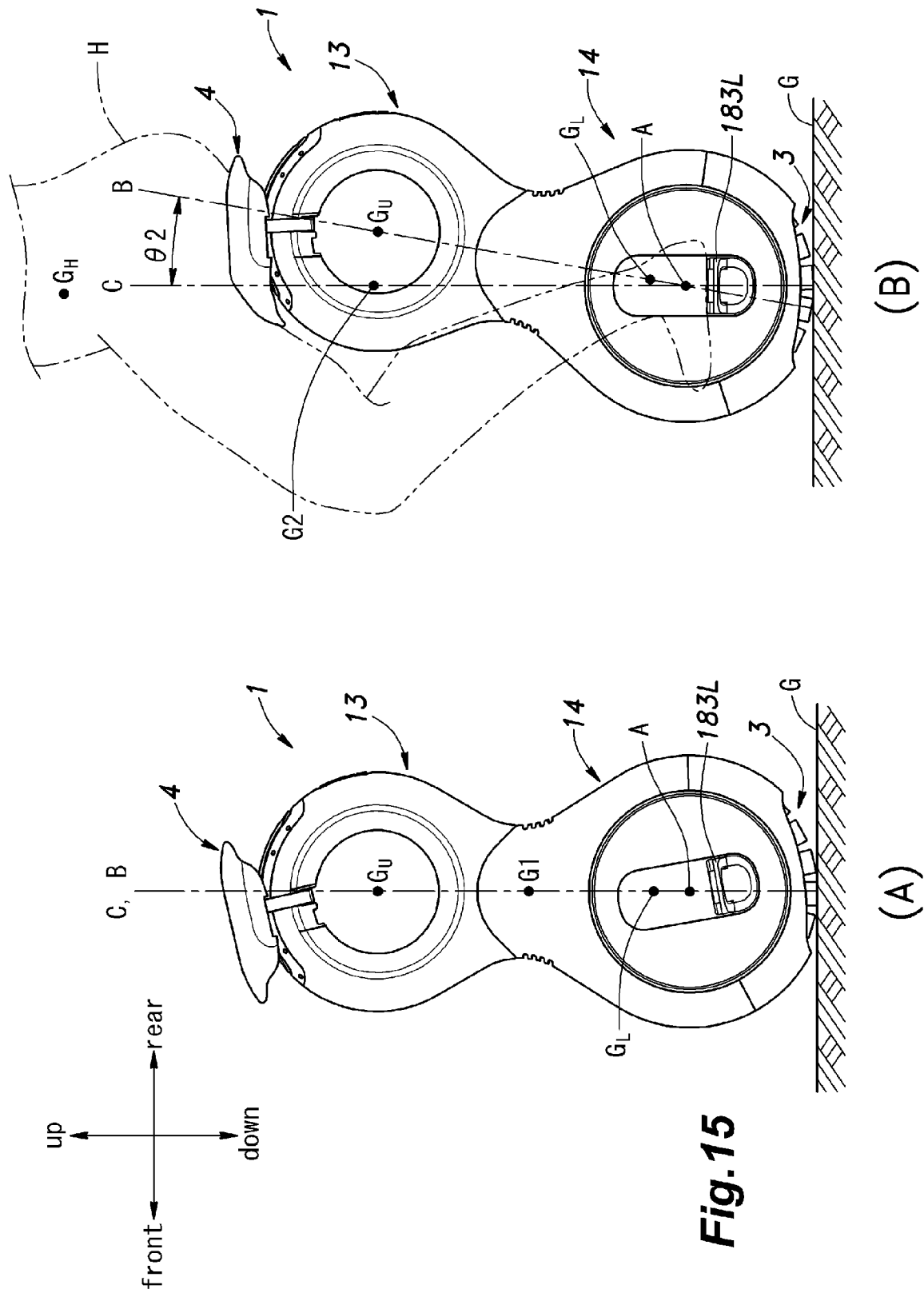
FIGS. 15(A) and 15(B) are side views showing the inverted pendulum type vehicle in an upright posture thereof with and without a rider seated on the saddle of the vehicle, respectively.
Figure 16:
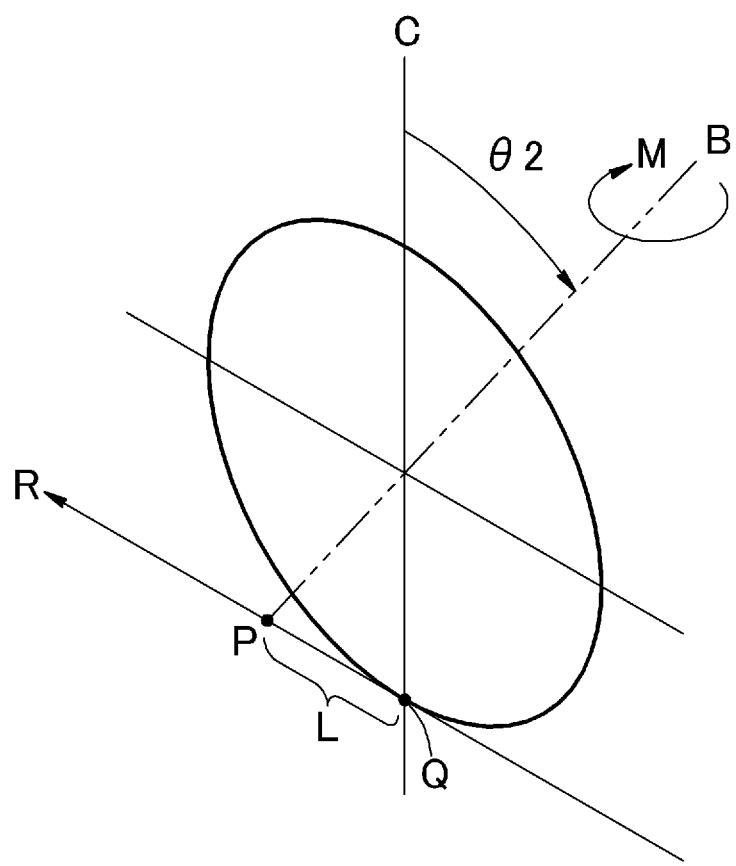
FIG. 16 is a diagram showing the geometry of the main wheel when performing a turning movement.

As shown in FIG. 15(A), when there is no rider on the vehicle 1 of the illustrated embodiment, as the upper structure 13 and lower structure 14 are symmetric in both the fore and aft direction and the lateral direction, the gravitation center Gu of the upper structure 13 and the gravitation center G1 of the lower structure 14 are located substantially on the axial line B. Therefore, where there is no rider on the vehicle, the axial line B of the lower structure 14 substantially coincides with the plumb vertical line C so that the reference angle θ1 is set as approximately zero. Letter G in the drawings denotes the ground surface.

As shown in FIG. 15(B), when there is a rider sitting on the seat unit 4, the gravitational center GH of the rider H who typically has his or her bent knees protrude forward is locate ahead of the axial line B, the combined gravitational center G2 of the vehicle 1 and the rider H is located ahead of the axial line B. Therefore, a reference angle θ2 is defined such that the axial line B tilts rearward, and the gravitational center G2 is located exactly above the ground contact point of the drive unit 3. In regard to the lateral direction, as the rider H and the vehicle 1 are considered to be symmetric, the y component θy2 of the reference inclination angle θ2 is zero.

Although not shown in the drawings, also when the rider H is on the vehicle in a standing posture, a reference angle θ3 is defined such that the combined gravitational center G3 of the vehicle 1 and the standing rider is located exactly above the ground contact point of the drive unit 3. Again, the y component θy3 of the reference inclination angle θ3 is zero.

The control circuit 261 generates PWM signals for controlling the left driver circuit 253 and right driver circuit 254 so as to agree the inclination angle θ with the reference angle θ1-θ3 for each of the vehicle occupant situations. According to the given PWM signals, the left driver circuit 253 and right driver circuit 254 supply electric power to the electric motors 82L and 82R to actuate them in a corresponding manner.

The structure described in the foregoing allows the vehicle 1 to maintain an upright posture in which the axial line B of the lower structure 14 agrees with the corresponding reference angle θ1-θ3 by virtue of the inverted pendulum control. The vehicle 1 is driven by the rider shifting his or her weight in a prescribed direction. When the weight of the vehicle operator is shifted in a desired direction, the axial line B of the lower structure tilts in the desired direction. The control circuit 261 then drives the drive unit 3 so as to agree the inclination angle θ with the reference angle θ2, θ3 of the corresponding vehicle occupant situation, and this causes the vehicle to travel in the desired direction.

Mode of Operation of the Embodiment

The vehicle 1 is able to make any translational movement in both the fore and aft and lateral directions while maintaining an upright posture. When a turning movement involving a yaw rate is required, the rider may cause the rider's corresponding leg to engage the road surface while the vehicle 1 is traveling so that the vehicle 1 may turn around the rider's leg engaging the road surface. Alternatively, a turning movement of the vehicle 1 may be achieved by creating a rotational moment (torque) around the ground contact point by performing a movement that causes the moment of inertia of the rider to change such as sticking out or retracting arms while the rider twists his or her torso. However, in either case, some complex procedures are required, and the rider is required to acquire some skill before becoming capable of performing a turning maneuver. Therefore, it is desired that the vehicle 1 may be turned simply by laterally tilting the body of the rider or otherwise moving the gravitational center of the rider similarly as with a bicycle.

The vehicle 1 has three principal axes of inertia like any other rigid body. In this case, the principal axes of inertia may be those for the vehicle 1 without a rider. (Alternatively, the principal axes of inertia may also be those for the vehicle 1 with a rider.) The vehicle 1 of the illustrated embodiment is given with a relatively simple shape, and the principal axes of inertia thereof extend laterally, longitudinally (fore and aft direction) and vertically through the gravitational center line. As this vehicle is elongated in the vertical direction as compared to the lateral and longitudinal directions, the moment of inertia around the vertical principal axis of inertia is smaller than those around the other principal axes of inertia. In the illustrated embodiment, it is assumed that the minimum principal axis of inertia coincides with the axial line B of the lower structure. (However, the geometrical axial lines do not necessarily coincide with the axes of inertia.) When the vehicle 1 is in operation, the axial line B tilts rearward by the reference angle θ2 with respect to the plumb vertical line C.

Therefore, the point P of the ground surface through which the axial line B passes is located ahead of the ground contact point Q of the main wheel 85 by a certain trail L. Under this condition, if the rider laterally shifts his gravitational center and causes the vehicle to lean in the corresponding direction, the control circuit 261 acts so as to put the vehicle back to the upright posture, but the vehicle is subjected to a rotational moment (torque) M around the principal axis of inertia B that causes a rotation of the vehicle around the principal axis of inertia B. As a result, the line connecting the ground crossing point P of the axial line and the ground contact point Q of the main wheel 85 tilts with respect to the traveling direction R. This amounts to a steering action, and the vehicle 1 makes a turn toward the corresponding direction. In particular, as the vehicle 1 encounters the least resistance to the rotation around the principal axis of inertia B involving the least moment of inertia as compared to the rotations around other axial lines, the turning movement is achieved all the more easily.

In the illustrated embodiment, the electric motors and the battery account for a large part of the mass of the vehicle, and the gravitational center of the battery is located above and behind the gravitational center of the vehicle while the gravitational center of the electric motors is located below and ahead of the gravitational center of the vehicle. Therefore, the moment of inertia around the minimum principal axis of inertia can be made significantly smaller than those around the other axes of inertia, and this contributes to the facility in effecting a turning maneuver of the vehicle.

Figure 17:
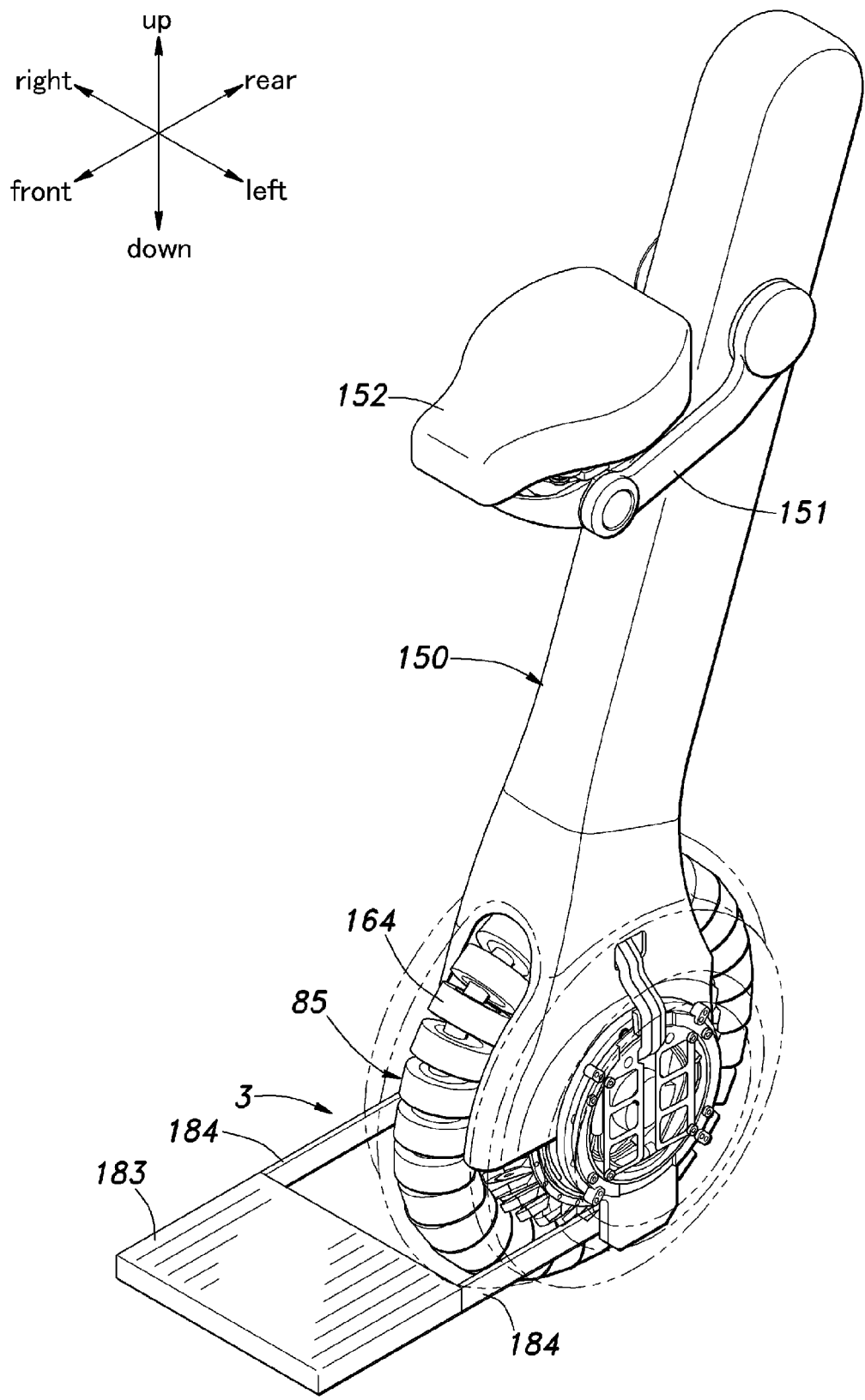
FIG. 17 is a perspective view showing a second embodiment of the inverted pendulum type vehicle according to the present invention.

FIG. 17 shows a second embodiment of the inverted pendulum type vehicle according to the present invention. In FIG. 17, the parts corresponding to those of the previous embodiment are denoted with like numerals without repeating the description of such parts. This inverted pendulum type vehicle comprises a columnar frame 150, and a drive unit 3 similar to that of the first embodiment is incorporated in a lower part of the frame 150. Similarly as in the first embodiment, the drive unit 3 includes a main wheel 85 for producing a drive force in the fore and aft direction by turning in the circumferential direction. The main wheel 85 is provided with a plurality of driven rollers 164 that can produce a lateral drive force by rotating around the annular axial line thereof. By actuating these two components by using a drive mechanism and a control system similar to those of the first embodiment, the vehicle is kept upright and propelled in any desired direction.

A pair of arms 184 extend forward from either side of a lower part of the frame 150, and a step 183 is provided across the front ends of the arms 184. The step 183 is fixed in position in the illustrated embodiment, but may also be lifted out of the way or detached as required for the convenience of transporting and storing the vehicle. At any event, by placing the step 183 in a forward part of the vehicle, the principal axis of inertia of the vehicle can be tilted rearward in a significant manner. Furthermore, a saddle 152 is attached to an upper front part of the frame 50 via a pair of forwardly extending arms 184.

A rider sits on the saddle 152 with his back facing the frame 150. Similarly as in the first embodiment, as the rider shifts his weight laterally or in the fore and direction, the vehicle travels in the corresponding direction at a corresponding speed. In this case also, the vehicle can perform translational movement at will, but some effort could be required when a turning movement is attempted. Therefore, the minimum principal axis of inertia of the vehicle extending along the axial direction of the frame is tilted rearward with respect to the plumb vertical line. Therefore, as the rider laterally shifts his weight as an attempt to tilt the vehicle in the corresponding direction, a rotational movement around the minimum principal axis of inertia of the vehicle is created, and the vehicle can be turned in the desired direction.

Figure 18:
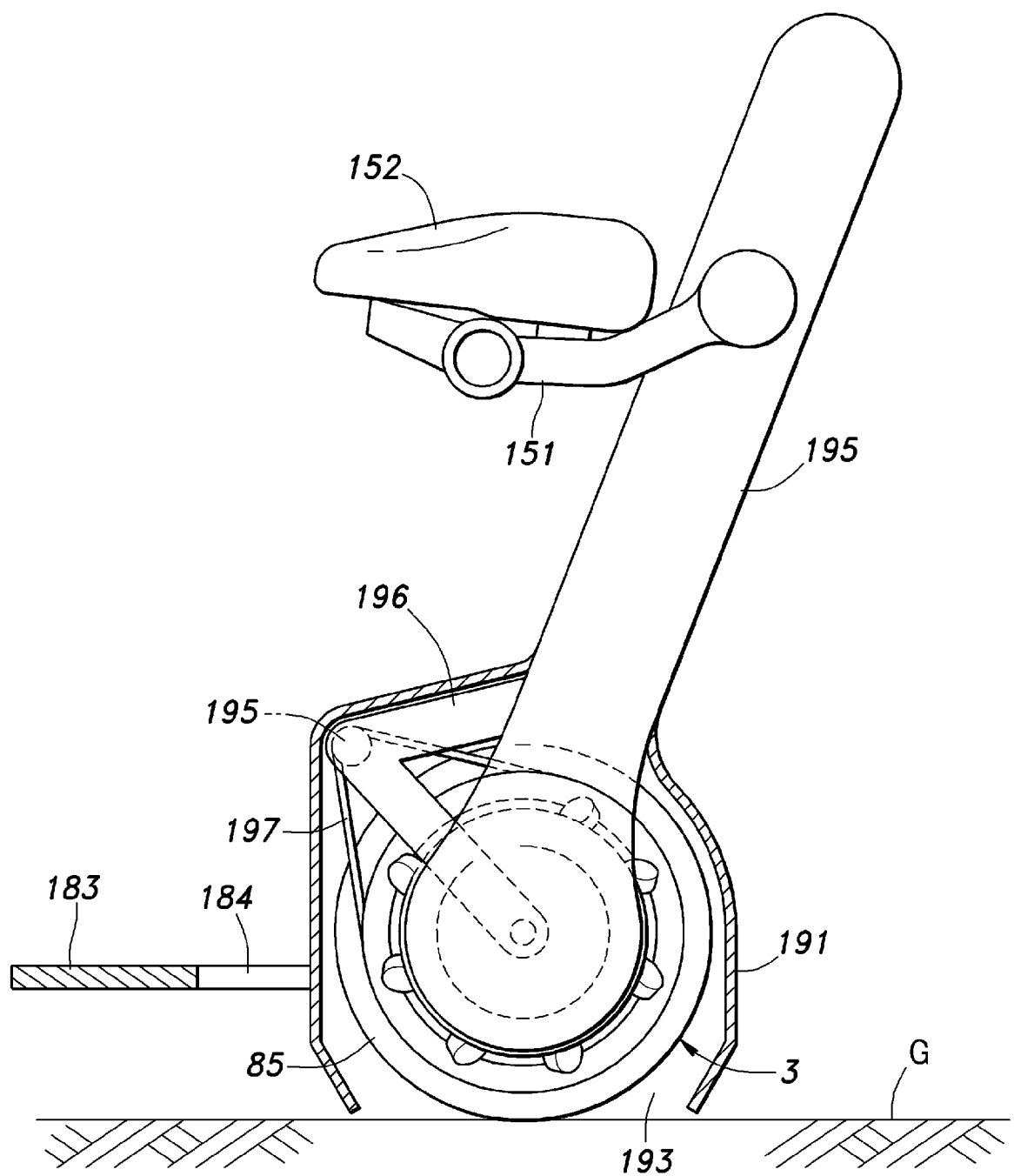
FIG. 18 is a perspective view showing a third embodiment of the inverted pendulum type vehicle according to the present invention.

FIG. 18 shows a third embodiment of the inverted pendulum type vehicle according to the present invention. In FIG. 18, the parts corresponding to those of the previous embodiments are denoted with like numerals without repeating the description of such parts. This inverted pendulum type vehicle comprises a box-shaped frame 191 having an open bottom and a drive unit 3 similar to those of the previous embodiments fixedly secured inside the frame 191 and provided with a main wheel 85 engaging the ground surface G. The drive unit 3 is substantially covered by the frame 191 except for the lower part of the main wheel 85 which is exposed at a bottom opening 193 of the frame 191.

The drive unit 3 is provided with a pair of electric motors 195 which are attached to the free end of a motor arm 196 that extends forwards from the front face of the frame 191, instead of being coaxially disposed with the main wheel 85, and power is transmitted from the electric motors 195 to the drive unit 3 via a pair of endless belts 197.

A frame extension 195 extends from the upper end of the frame 191 in an upward and rearward direction, and a saddle 152 is attached to a saddle arm 151 extending forward from the front face of an upper part of the frame extension 195. A step 183 is provided on a pair of arms 184 that extend from the front face of a lower part of the frame 191.

Thereby, the vehicle is enabled to travel in any desired direction, both in the fore and aft and lateral directions, by the drive unit 3. In this case, the electric motors 195 having a relatively large mass is provided in the forward part of the lower part of the frame 191, and the battery also having a relatively large mass is provided with the rearward part of the upper part of the frame extension 195, the principal axis of inertia of the vehicle can be tilted rearward in a significant manner.

In this case also, a rider sits on the saddle 152 with his back facing the frame extension 195. Similarly as in the first and second embodiments, as the rider shifts his weight laterally or in the fore and direction, the vehicle travels in the corresponding direction at a corresponding speed. In this case also, the vehicle can perform translational movement at will, but some effort could required when a turning movement is attempted. Therefore, the minimum principal axis of inertia of the vehicle extending along the axial direction of the frame extension 195 is tilted rearward with respect to the plumb vertical line. Therefore, as the rider laterally shifts his weight as an attempt to tilt the vehicle in the corresponding direction, a rotational movement around the minimum principal axis of inertia of the vehicle is created, and the vehicle can be turned in the desired direction.

Although the present invention has been described in terms of preferred embodiments thereof, it is obvious to a person skilled in the art that various alterations and modifications are possible without departing from the scope of the present invention.

GLOSSARY 1 inverted pendulum type vehicle
2, 150 frame
3 drive unit
4 seat unit
5 control unit
6 load sensor
7 tilt sensor (inclination angle detecting means)
10 battery unit
11 electric unit
13 upper structure
14 lower structure
21 upper frame
22 lower frame
24 saddle storage space
29 connecting recess
36 notch
63L, 63R, 152 saddle part
82L, 82R electric motor
84L, 84R drive member
85 main wheel
121L, 121R drive disk
122L, 122R drive roller
161 annular member
164 driven roller
180L, 180R step base
183L, 183R step
261 control circuit
263 left driver circuit
264 right driver circuit
265 input interface circuit
266 output interface circuit
244 motor driver circuit board
246 air passage
247 air fan
281 battery module
285 battery management circuit

The invention claimed is:

1. An inverted pendulum vehicle, comprising:
a base frame provided with a drive unit;
a main wheel provided in a lower part of the base frame and configured to be circumferentially actuated by the drive unit;
a rider support unit provided in the base frame for supporting a rider of the vehicle; and
a forward motion control unit for propelling the vehicle by controlling a circumferential drive force applied to the main wheel according to a condition of the vehicle and maintaining the vehicle in an upright posture;
wherein a substantially vertical principal axis of inertia of the vehicle is tilted rearward with respect to a plumb vertical line.

2. The inverted pendulum vehicle according to claim 1, further comprising a plurality of driven rollers provided on the main wheel so as to be rotatively driven around a circumferential axial line of the main wheel, and a lateral motion control unit configured to maintain the vehicle in an upright posture by controlling a rotational drive force applied to each driven roller according to a condition of the vehicle.

3. The inverted pendulum vehicle according to claim 1, wherein the principal axis of inertia consists of a minimum principal axis of inertia.

4. The inverted pendulum vehicle according to claim 1, further comprising a battery for powering the drive unit, the battery being positioned such that a gravitational center of the battery is located above and behind a gravitational center of the vehicle.

5. The inverted pendulum vehicle according to claim 1, wherein the drive unit comprises an electric motor, the electric motor being positioned such that a gravitational center of the electric motor is located below and ahead of a gravitational center of the vehicle.

* * * * *